United States Patent
Held et al.

(10) Patent No.: US 11,768,375 B2
(45) Date of Patent: Sep. 26, 2023

(54) CONTROL OF VARIABLE-FOCUS LENSES IN A MIXED-REALITY DEVICE FOR PRESBYOPES

(71) Applicant: Microsoft Technology Licensing, LLC, Redmond, WA (US)

(72) Inventors: Robert Thomas Held, Redmond, WA (US); Bernard Charles Kress, Redmond, WA (US); Ashley Saulsbury, Redmond, WA (US); Dmitry Reshidko, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 17/465,907

(22) Filed: Sep. 3, 2021

(65) Prior Publication Data

US 2023/0069895 A1 Mar. 9, 2023

(51) Int. Cl.
*G02B 27/01* (2006.01)
*G02B 27/00* (2006.01)
*G02C 7/08* (2006.01)

(52) U.S. Cl.
CPC ........ *G02B 27/0172* (2013.01); *G02B 27/0093* (2013.01); *G02C 7/081* (2013.01); *G02B 2027/0174* (2013.01); *G02B 2027/0178* (2013.01); *G02B 2027/0194* (2013.01); *G02C 2202/24* (2013.01)

(58) Field of Classification Search
CPC ... G02B 27/0172; G02B 27/0093; G02C 7/081; G02B 2027/0174; G02B 2027/0178; G02B 2027/0194; G02C 2202/24
See application file for complete search history.

(56) References Cited

U.S. PATENT DOCUMENTS 10,319,154 B1 * 6/2019 Chakravarthula et al. .................
G06T 19/006
11,042,039 B1 * 6/2021 Trail ................... G02B 27/283
(Continued)

FOREIGN PATENT DOCUMENTS

WO 2017120475 A1 7/2017
WO 2019173390 A1 9/2019
(Continued)

OTHER PUBLICATIONS

"International Search Report and Written Opinion Issued in PCT Application No. PCT/US22/036602", Mailed Date: Oct. 17, 2022, 11 Pages.

*Primary Examiner* — Bryan Earles
(74) *Attorney, Agent, or Firm* — Mark K. Young; Mayer & Williams, PC

(57) ABSTRACT

Variable-focus lenses are arranged as a lens pair that work on opposite sides of a see-through optical combiner used in a mixed-reality head-mounted display (HMD) device. An eye-side variable-focus lens is configured as a negative lens over an eyebox of the see-through optical combiner to enable virtual-world objects to be set at a close distance. The negative lens is compensated by its conjugate using a real-world-side variable-focus lens configured as a positive lens to provide for an unperturbed see-through experience. For non-presbyopes, the powers of the lenses are perfectly offset. For presbyopes, the lens powers may be mismatched at times to provide simultaneous views of both virtual-world and real-world objects on the display in sharp focus. Responsively an eye tracker indicating that the user is engaged in close viewing, optical power is added to the real-world-side lens to push close real-world objects optically farther away and into sharp focus for the presbyopic user.

15 Claims, 16 Drawing Sheets

(56) References Cited

U.S. PATENT DOCUMENTS

| | | | |
|---|---|---|---|
| 11,217,024 B2* | 1/2022 | Sztuk et al. | G02B 27/0093 |
| 11,391,906 B2* | 7/2022 | Hudman | G02B 7/023 |
| 2015/0277145 A1* | 10/2015 | Bakaraju et al. | A61B 3/103 |
| | | | 351/159.01 |
| 2017/0293146 A1* | 10/2017 | Nicholls et al. | G02B 27/0093 |
| 2020/0301239 A1 | 9/2020 | Akkaya et al. | |
| 2021/0141212 A1* | 5/2021 | Jacoby et al. | G02C 7/14 |
| 2021/0149197 A1* | 5/2021 | Yadin et al. | G02B 26/06 |
| 2022/0019080 A1* | 1/2022 | Schultz | G02B 6/00 |

FOREIGN PATENT DOCUMENTS

WO    2019186132 A2    10/2019

\* cited by examiner

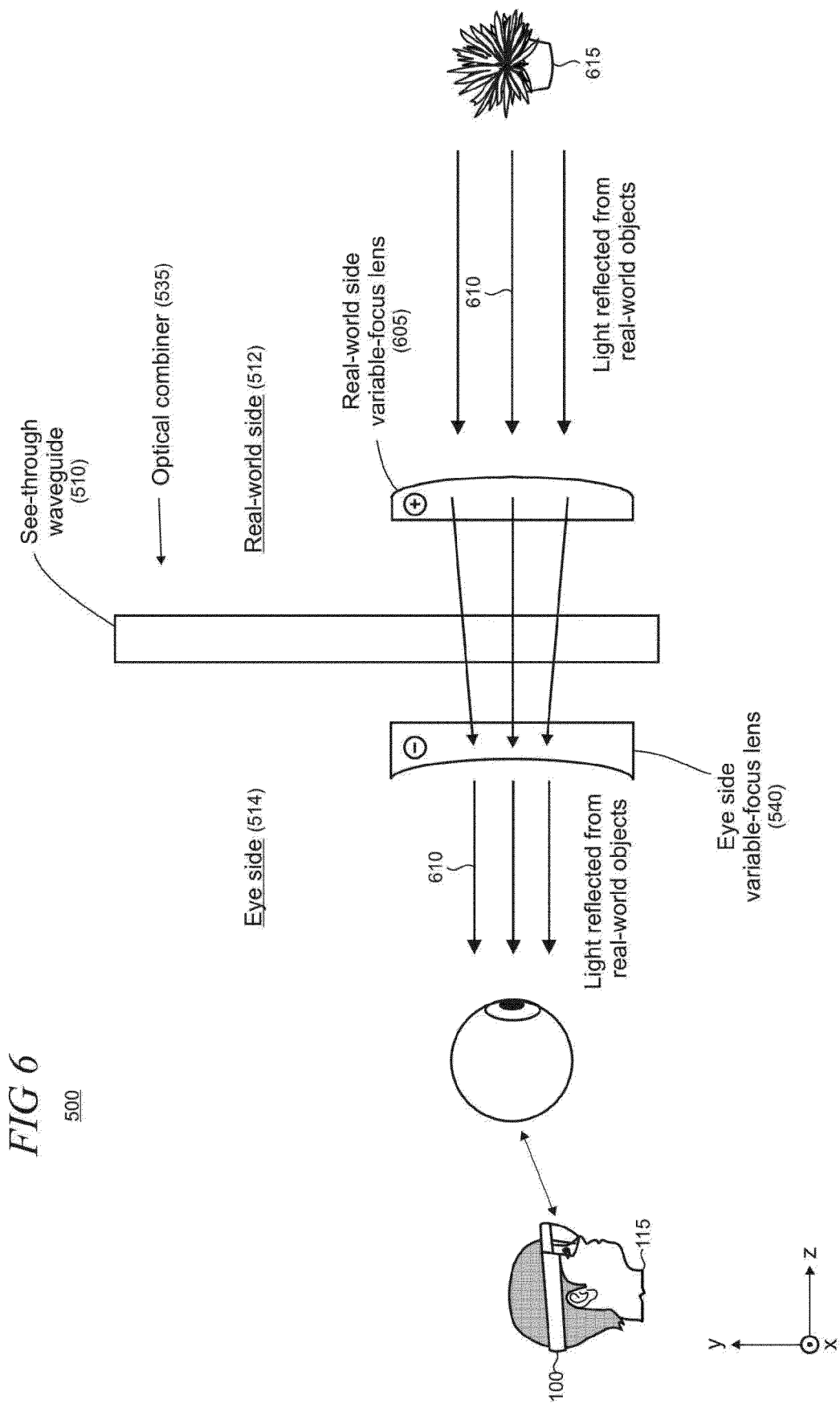

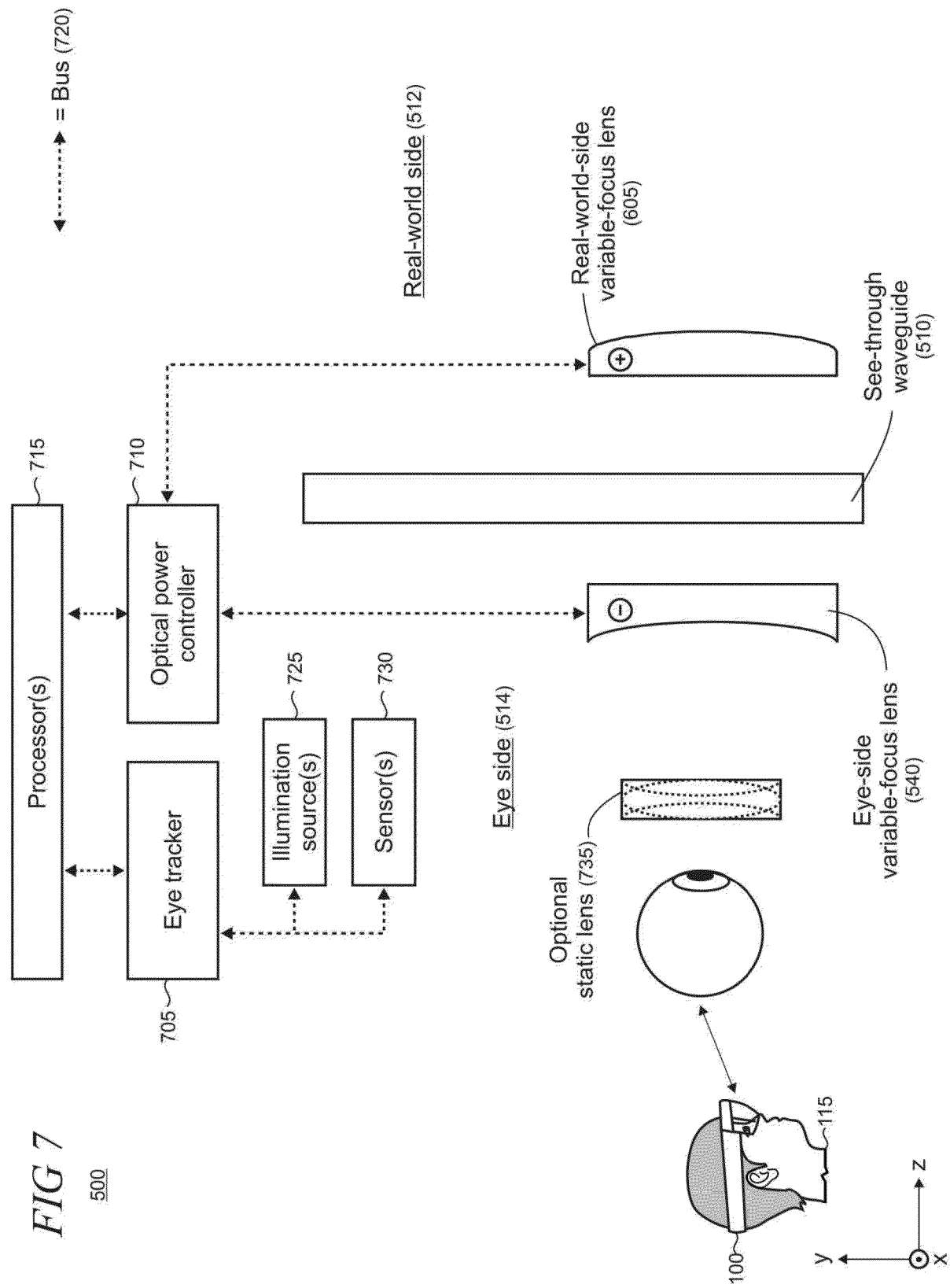

FIG 8
800

| User type | HMD device use case | Eye-side variable-focus lens | Real-world-side variable-focus lens |
|---|---|---|---|
| 1. Presbyopic user can see far away objects clearly without corrective lenses | Far viewing | Operates in its baseline configuration to support predetermined focal plane depth | Operates in its baseline configuration to cancel eye-side baseline impact on real-world objects |
| | Close viewing | | Operates with optical power added to its baseline configuration |
| 2. Presbyopic user can see far away objects clearly with corrective lenses | Far viewing | Operates in a modified configuration that incorporates user's corrective lens prescription into its baseline configuration | Operates in its baseline configuration to cancel eye-side baseline impact on real-world objects |
| | Close viewing | | Operates with optical power added to its baseline configuration |
| 805 | 810 | 815 | 820 |

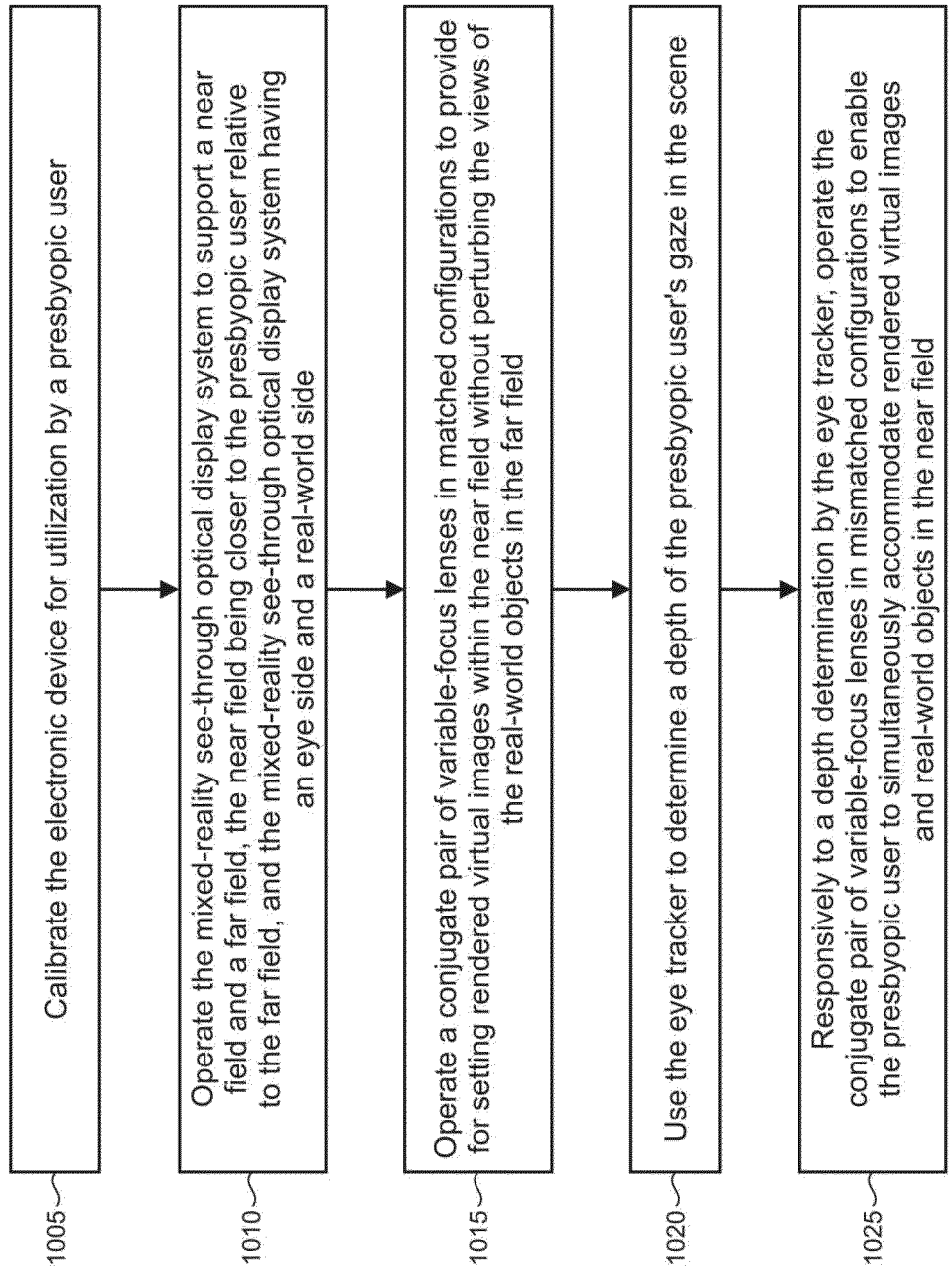

CONTROL OF VARIABLE-FOCUS LENSES IN A MIXED-REALITY DEVICE FOR PRESBYOPES

BACKGROUND

Presbyopia is an ocular condition in which one loses the ability to optically focus (or accommodate) one's eyes to varying distances. While the age of people experiencing the onset of presbyopia (referred to as "presbyopes") may vary, rapid reduction in accommodation range typically begins around 45 years of age, with virtually 100 percent of people over the age of 55 years being presbyopic. For presbyopes who began with normal vision, their natural accommodation state effectively rests at optical infinity, making it hard to accommodate on near (e.g., < 1 m) objects.

SUMMARY

Variable-focus lenses are arranged as a conjugate lens pair that work on opposite sides of a see-through optical combiner used in a mixed-reality head-mounted display (HMD) device in which virtual images are superimposed over views of real-world objects. An eye-side variable-focus lens is configured as a negative lens over an eyebox of the optical combiner to enable virtual images to be placed at predetermined (i.e., non-infinite) depth from the device user to enhance visual comfort. The negative lens is compensated by its conjugate using a real-world-side variable-focus lens that is configured as a positive lens to provide for an unperturbed see-through experience.

For non-presbyopes (i.e., emmetropes), the powers of the negative and positive lenses are perfectly offset so that no net optical power is provided to the real world viewed through the see-through optical combiner. For a presbyopic HMD device user, the lens powers may be mismatched at times to enable the user to simultaneously view both virtual-world and real-world objects on the display in sharp focus. Responsively to an eye tracker in the HMD device that indicates that the user is engaged in close viewing, optical power is added to the real-world-side variable-focus lens to push close real-world objects optically farther away and into sharp focus for the presbyopic user.

In an illustrative embodiment, the variable-focus lens pair may be configured to work in combination to integrate a user's corrective lens prescription into the HMD device. Such integration enables the HMD device to be utilized without the need for the user to wear glasses or contact lenses. The HMD device can replicate dual-prescription functionality to correct for both near and far vision impairments of the user by adapting the eye-side variable focus lens in a modified configuration to include the user's corrective prescription for both close and far use cases. The real-world-side lens may provide additional optical power when the eye tracker indicates that the user is engaged in close viewing to push close real-world objects optically farther away and into sharp focus.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 6 shows a side view of an illustrative virtual display system in which variable-focus lenses are arranged as a conjugate lens pair;

FIG. 7 shows a side view of an illustrative virtual display system in operative relationship with HMD device components including an eye tracking system, optical power controller, and processors;

FIG. 8 is a table that shows illustrative operational configurations for the variable-focus lens pair for different user types and use cases;

FIG. 10 is a flowchart of an illustrative method for operating an electronic device that includes an eye tracker and a mixed-reality see-through optical display system for showing scenes comprising virtual images that are superimposed over views of real-world objects;

DETAILED DESCRIPTION

Presbyopes (i.e., persons who have presbyopia) present a unique challenge to mixed-reality HMD devices that do not afford wearing spectacles during use. These devices usually have a fixed focal plane for the digital content they overlay on the real world. Thus, even if a presbyopic user did not require glasses for distance viewing and the virtual reality images were placed at a far distance that appeared sharp, if the user needed to look at a close-by object (e.g., their smartphone), they would not be able to see that object sharply without removing the HMD device and donning reading glasses. Meanwhile, if digital content were meant to be overlaid on nearby real-world objects, the user would not be able to see both the digital and real content in sharp focus at the same time.

While some conventional HMD devices can provide comfortable user experiences for users who wear glasses, such devices typically do not accommodate presbyopes. The disclosed arrangement provides for control of a pair of variable-focus lenses to enable presbyopes to sharply and comfortably view both virtual-world and real-world objects at any distance.

Figure 1:
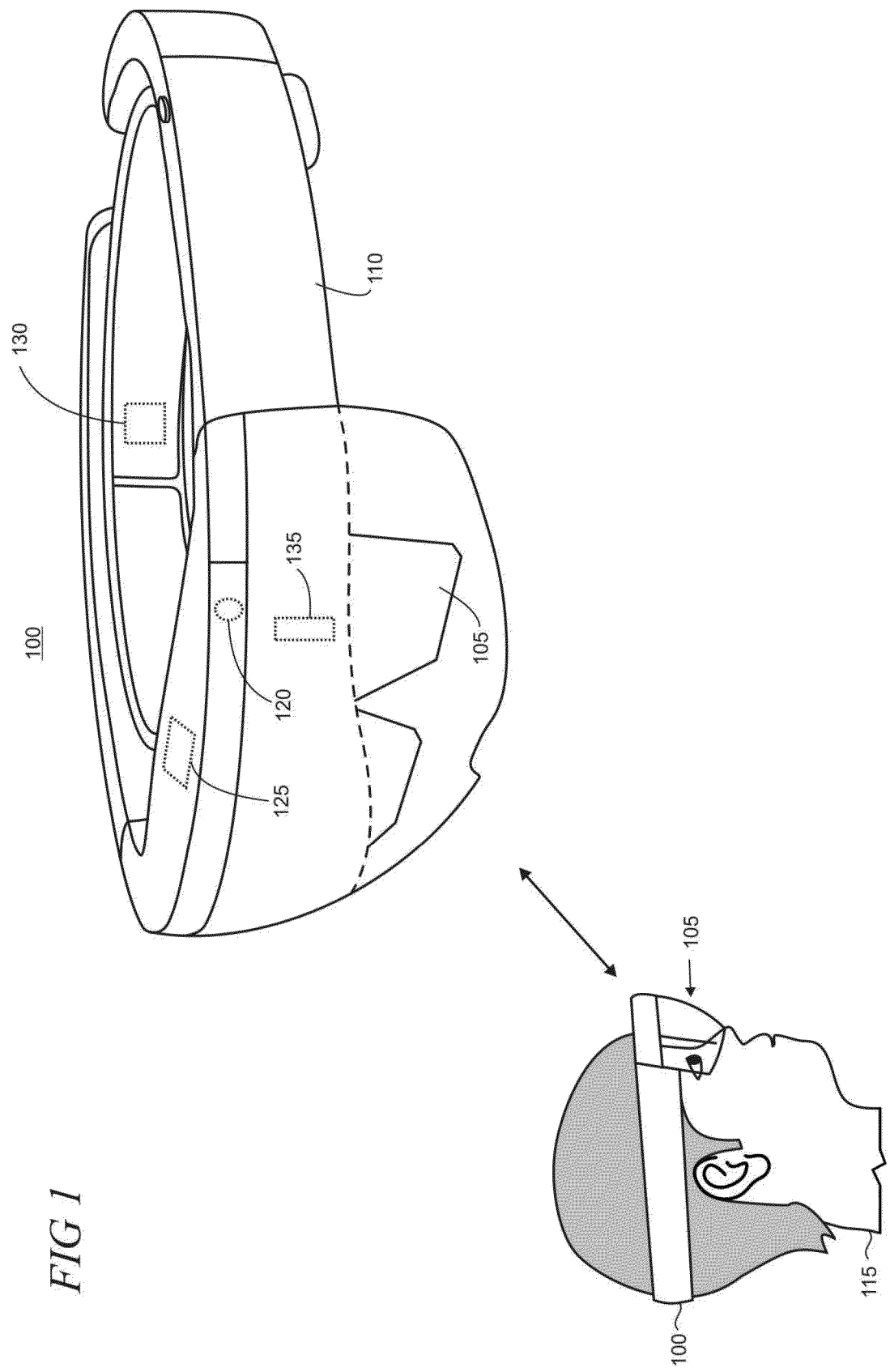
FIG. 1 shows a pictorial partially cutaway view of an illustrative HMD device that is configured with the present control of variable-focus lenses in a mixed-reality device for presbyopes.

Turning now to the drawings, FIG. 1 shows a pictorial partially cutaway view of an illustrative mixed-reality HMD device 100 that is configured to implement the present control of variable-focus lenses in a mixed-reality device for presbyopes. In this example, the HMD device includes a display device 105 and a frame 110 that wraps around the head of a user 115 to position the display device near the user's eyes to provide a mixed-reality experience to the user.

Any suitable technology and configuration may be used to display virtual images, which may also be referred to as holograms or holographic images, using the display device 105. For a mixed-reality experience, the display device may be see-through so that the user of the HMD device 100 can view physical, real-world objects in the physical environment over which pixels for virtual objects are overlayed. For example, the display device may include one or more partially transparent waveguides used in conjunction with a virtual image source such as, for example, a microdisplay comprising RGB (red, green, blue) LEDs (light emitting diodes), an organic LED (OLED) array, liquid crystal on silicon (LCoS) device, and/or MEMS device, or any other suitable displays or microdisplays operating in transmission, reflection, or emission. The virtual image source may also include electronics such as processors, optical components such as mirrors and/or lenses, and/or mechanical and other components that enable a virtual display to be composed and provide one or more input optical beams to the display system. Virtual image sources may be referred to as light or display engines in some contexts.

In some implementations, outward facing cameras 120 that are configured to capture images of the surrounding physical environment may be provided. Such captured images may be rendered on the display device 105 along with computer-generated virtual images that augment the captured images of the physical environment.

The frame 110 may further support additional components of the HMD device 100, including a processor 125, an inertial measurement unit (IMU) 130, and an eye tracker 135. In some implementations, the eye tracker can be configured to support one or more of vergence tracking and/or gaze tracking functions. The processor may include logic and associated computer memory configured to receive sensory signals from the IMU and other sensors, to provide display signals to the display device 105, to derive information from collected data, and to enact various control processes described herein.

The display device 105 may be arranged in some implementations as a near-eye display. In a near-eye display, the virtual image source does not actually shine the images on a surface such as a glass lens to create the display for the user. This is not feasible because the human eye cannot focus on something that is that close. Rather than create a visible image on a surface, the near-eye display uses an optical system to form a pupil and the user's eye acts as the last element in the optical chain and converts the light from the pupil into an image on the eye's retina as a virtual display. It may be appreciated that the exit pupil is a virtual aperture in an optical system. Only rays which pass through this virtual aperture can exit the system. Thus, the exit pupil describes a minimum diameter of the holographic virtual image light after leaving the display system. The exit pupil defines the eyebox which comprises a spatial range of eye positions of the user in which the holographic virtual images projected by the display device are visible.

Figure 2:
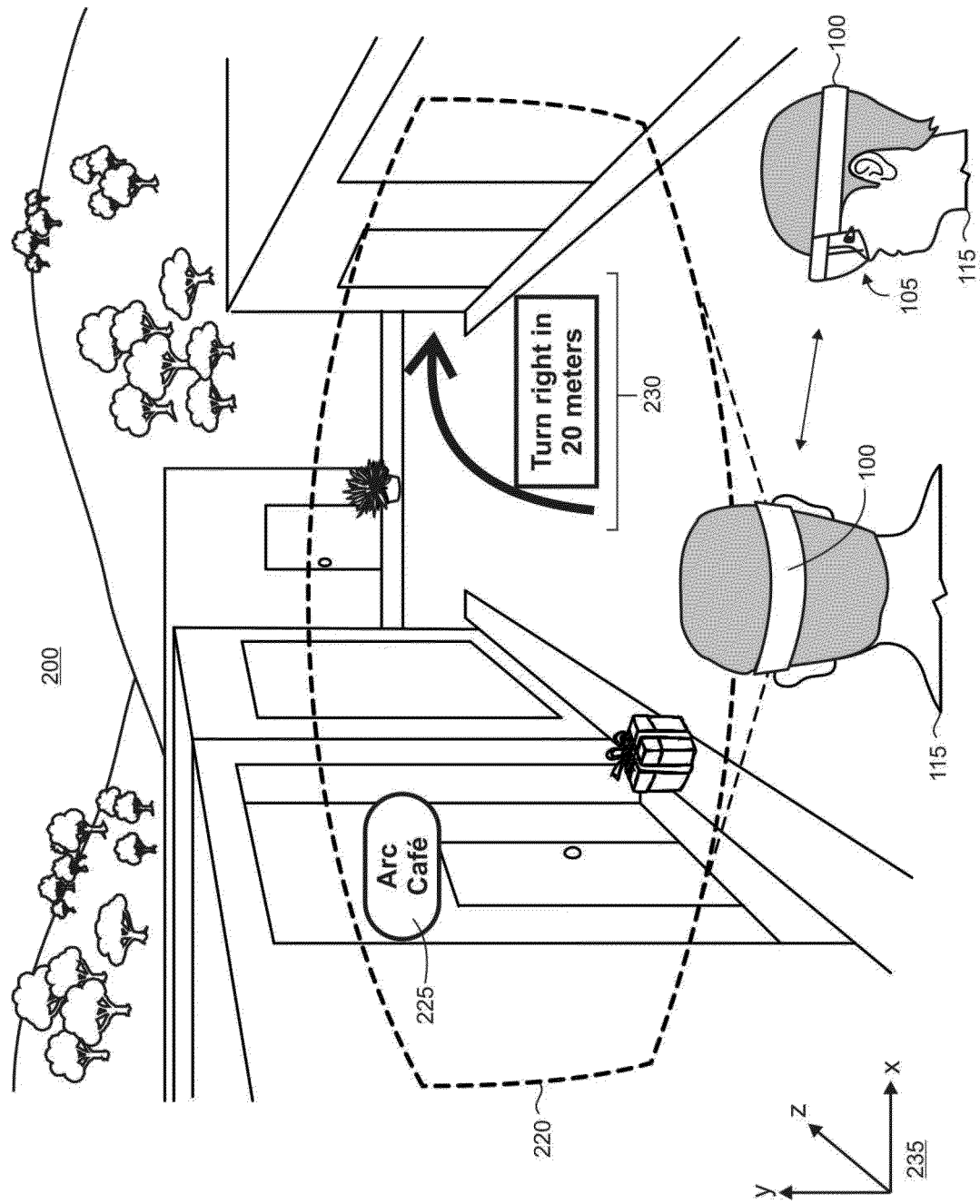
FIG. 2 illustratively shows holographic virtual images that are overlayed onto real-world images within a field of view (FOV) of a mixed-reality head-mounted display (HMD) device.

FIG. 2 shows the HMD device 100 worn by a user 115 as configured for mixed-reality experiences in which the display device 105 is configured as a near-eye display system having at least a partially transparent, see-through waveguide, among various other components, and may be further adapted to utilize variable-focus lenses in accordance with the principles discussed herein. As noted above, a virtual image source (not shown) generates holographic virtual images that are guided by the waveguide in the display device to the user. Being see-through, the waveguide in the display device enables the user to perceive light from the real world.

The see-through waveguide-based display device 105 can render holographic images of various virtual objects that are superimposed over the real-world images that are collectively viewed using the see-through waveguide display to thereby create a mixed-reality environment 200 within the HMD device's FOV (field of view) 220. It is noted that the FOV of the real world and the FOV of the holographic images in the virtual world are not necessarily identical, as the virtual FOV provided by the display device is typically a subset of the real FOV. FOV is typically described as an angular parameter in horizontal, vertical, or diagonal dimensions.

It is noted that FOV is just one of many parameters that are typically considered and balanced by HMD device designers to meet the requirements of a particular implementation. For example, such parameters may include eyebox size, brightness, transparency and duty time, contrast, resolution, color fidelity, depth perception, size, weight, form factor, and user comfort (i.e., wearable, visual, and social), among others.

In the illustrative example shown in FIG. 2, the user 115 is physically walking in a real-world urban area that includes city streets with various buildings, stores, etc., with a countryside in the distance. The FOV of the cityscape viewed on HMD device 100 changes as the user moves through the real-world environment and the device can render static and/or dynamic virtual images over the real-world view. In this illustrative example, the holographic virtual images include a tag 225 that identifies a restaurant business and directions 230 to a place of interest in the city. The mixed-reality environment 200 seen visually on the waveguide-based display device may also be supplemented by audio and/or tactile/haptic sensations produced by the HMD device in some implementations.

Virtual images and digital content can be located in various positions within the FOV along all three axes of the coordinate system 235. The immersiveness of the content in three dimensions may be enhanced as the reach of the display along the "z" axis extends from the near field focus plane (i.e., generally within arm's length of the HMD device user) to the far field focus plane (i.e., generally beyond arm's reach) to facilitate arm's length virtual display interactions. Many mixed-reality HMD device experiences will employ a mix of near-field and far-field visual components. The boundary between near and far fields is not necessarily strictly defined and can vary by implementation. For example, distances beyond 2 m may be considered as a part of the far field in some mixed-reality HMD device scenarios.

During natural viewing, the human visual system relies on multiple sources of information, or "cues," to interpret three-dimensional shapes and the relative positions of objects. Some cues rely only on a single eye (monocular cues), including linear perspective, familiar size, occlusion, depth-of-field blur, and accommodation. Other cues rely on both eyes (binocular cues), and include vergence (essentially the relative rotations of the eyes required to look at an object) and binocular disparity (the pattern of differences between the projections of the scene on the back of the two eyes).

To view objects clearly, humans must accommodate, or adjust their eyes' focus, to the distance of the object. At the same time, the rotation of both eyes must converge to the object's distance to avoid seeing double images. In natural viewing, vergence and accommodation are linked. When viewing something near (e.g., a housefly close to the nose) the eyes cross and accommodate to a near point. Conversely, when viewing something at optical infinity, the eyes' lines of sight become parallel, and the eyes' lenses accommodate to infinity.

In typical HMD devices, users will always accommodate to the focal distance of the display (to get a sharp image) but converge to the distance of the object of interest (to get a single image). When users accommodate and converge to different distances, the natural link between the two cues must be broken and this can lead to visual discomfort or fatigue due to such vergence-accommodation conflict (VAC). Accordingly, to maximize the quality of the user experience and comfort with the HMD device 100, virtual images may be rendered in a plane to appear at a constant distance from the user's eyes. For example, virtual images, including the images 225 and 230, can be set at a fixed depth (e.g., 2 m) from the user 115. Thus, the user will always accommodate near 2 m to maintain a clear image in the HMD device. It may be appreciated that 2 m is an illustrative distance and is intended to be non-limiting. Other distances may be utilized, and virtual images may typically be optimally placed at distances between 1.5 and 5 m from the HMD device user for many applications of a mixed-reality HMD device while ensuring user comfort, however in some applications and use cases, virtual images can be rendered more closely to the user.

Figure 3A:
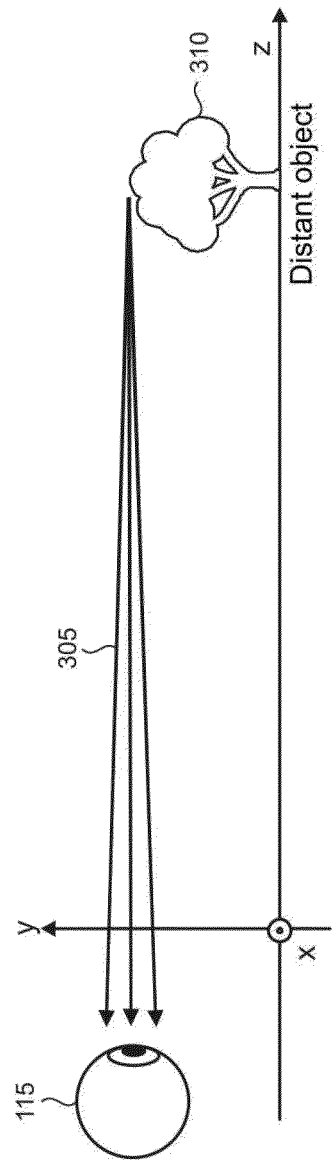
FIGS. 3A, 3B, and 3C show illustrative partially spherical wavefronts that are respectively associated with a distant object, an object at infinity, and a nearby object.
Figure 3B:
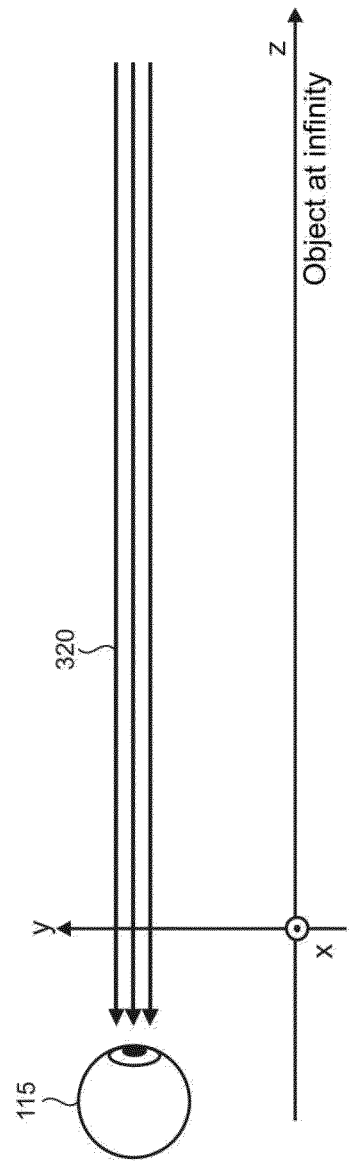
Figure 3C:
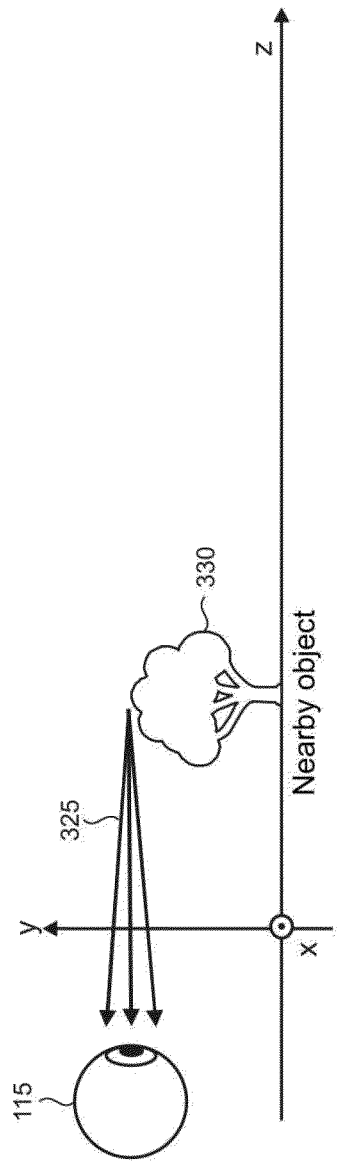

In the real world as shown in FIG. 3A, light rays 305 from distant objects 310 reaching an eye of a user 115 are almost parallel. Real-world objects at optical infinity (roughly around 6 m and farther for normal vision) have light rays 320 that are exactly parallel when reaching the eye, as shown in FIG. 3B. Light rays 325 from a nearby real-world object 330 reach the eye with different, more divergent angles, as shown in FIG. 3C, compared to those for more distant objects.

Figure 4:
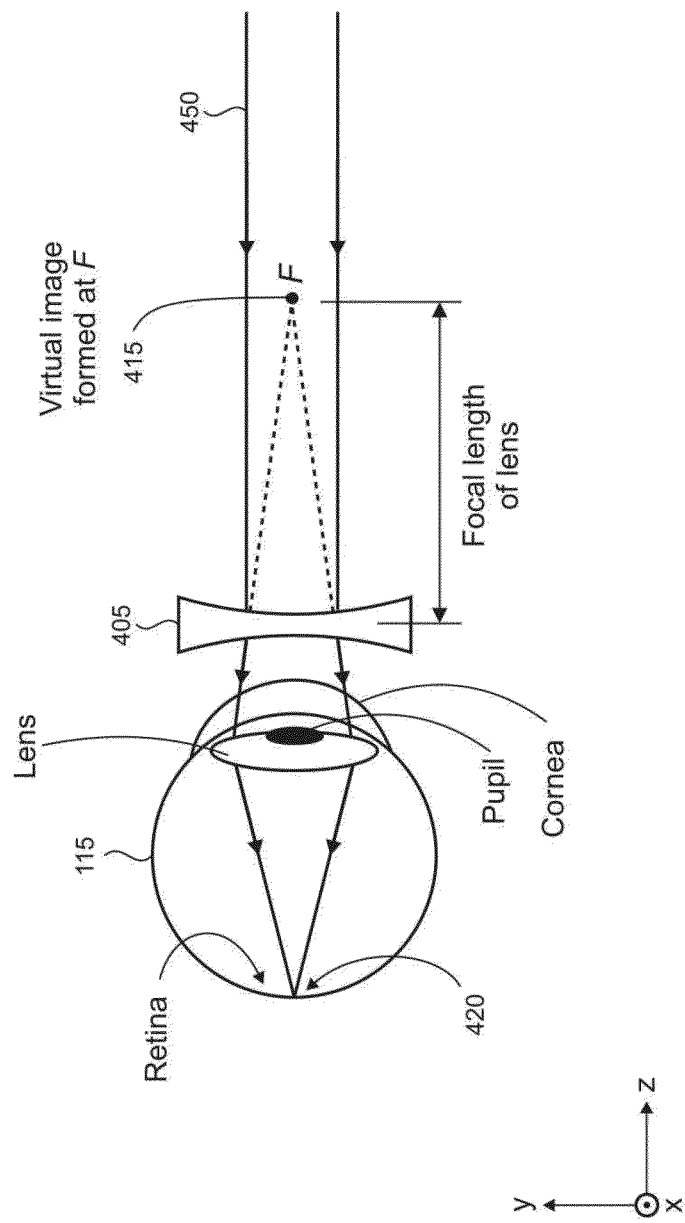
FIG. 4 shows an illustrative negative lens that provides for a virtual image that is located at a focal point of the lens.

Various approaches may be utilized to render virtual images with the suitable divergent angles to thereby appear at the targeted depth of focus. For example, FIG. 4 shows that a negative (i.e., concave) lens 405 can diverge the collimated/parallel rays 450 that are received from a conventional output coupler element (not shown) in an HMD device to produce a holographic virtual image having a location that is apparent to the user at a focal point, F (as indicated by reference numeral 415), that is determined by the focal length of the lens. For example, in various mixed-reality HMD device scenarios, focal lengths can range between -0.2 to -3.0 diopters (i.e., 33 cm to 5 m) to position virtual objects from the boundary of the far field (near infinity) to slightly more than one foot away. As shown, the rays from the negative lens arriving at the user's eye 115 are non-parallel and divergent and converge using the eye's internal lens to form the image on the retina, as indicated by reference numeral 420.

Figure 5:
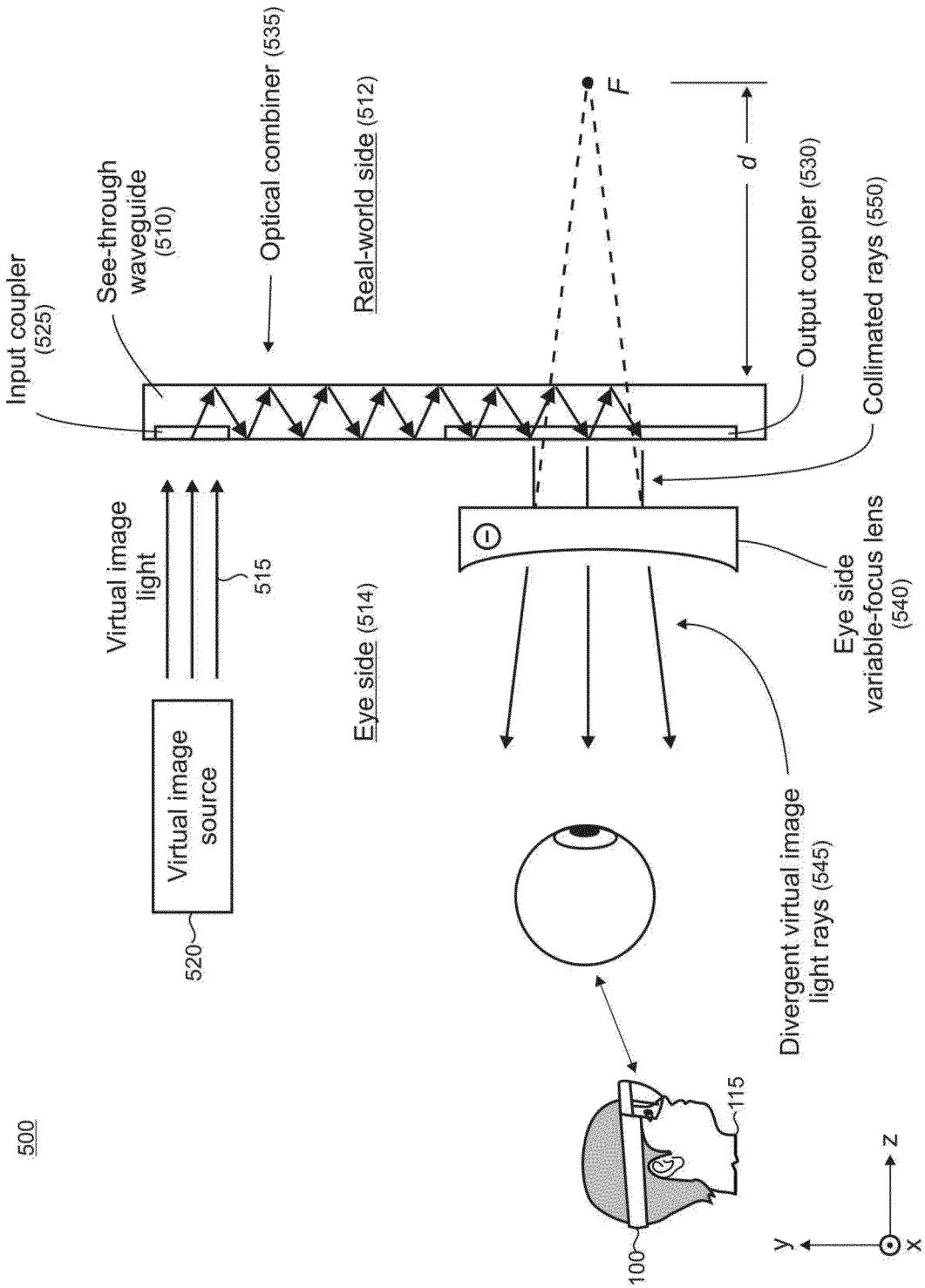
FIG. 5 shows a side view of an illustrative virtual display system that includes a waveguide-based optical combiner providing for rendering of virtual images in a focal plane having predetermined depth that may be used in an HMD device.

FIG. 5 shows a simplified side view of an illustrative virtual display system 500 that is incorporated into the display device 105 (FIG. 1) and which may be used in the HMD device 100 to render virtual images. The virtual display system may function as an optical combiner by superimposing the rendered virtual images over the user's view of light from real-world objects to thus form a mixed-reality display.

It is noted that the side view of FIG. 5 shows virtual display components for a single eye of the user 115. However, it may be appreciated that the components can be extended such that separate displays are provided for each eye of the user in binocular implementations. Such arrangement may facilitate, for example, stereoscopic rendering of virtual images in the FOV of the HMD device and enable prescription lens integration, as discussed below, on a per-eye basis.

The display system includes at least one partially transparent (i.e., see-through) waveguide 510 that is configured to propagate visible light. While a single waveguide is shown in FIG. 5 for the sake of clarity in exposition of the present principles, it will be appreciated that a plurality of waveguides may be utilized in some applications. For example, a stack of two or three waveguides can support a red, green, blue (RGB) color model that is utilized for rendering full color virtual images in some cases.

The waveguide 510 facilitates light transmission between the virtual image source and the eye. One or more waveguides can be utilized in the near-eye display system because they are transparent and because they are generally small and lightweight. This is desirable in applications such as HMD devices where size and weight are generally sought to be minimized for reasons of performance and user comfort. Use of the waveguide 510 can enable the virtual image source to be located out of the way, for example on the side of the user's head or near the forehead, leaving only a relatively small, light, and transparent waveguide optical element in front of the eyes.

In an illustrative implementation, the waveguide 510 operates using a principle of total internal reflection (TIR) so that light can be coupled among the various optical elements in the HMD device 100. TIR is a phenomenon which occurs when a propagating light wave strikes a medium boundary (e.g., as provided by the optical substrate of a waveguide) at an angle larger than the critical angle with respect to the normal to the surface. In other words, the critical angle ($\theta_c$) is the angle of incidence above which TIR occurs, which is given by Snell's Law, as is known in the art.

More specifically, Snell's law states that the critical angle ($\theta_c$) is specified using the following equation:

$$\theta_c = \sin^{-1}(n2/n1)$$

where $\theta_c$ is the critical angle for two optical mediums (e.g., the waveguide substrate and air or some other medium that is adjacent to the substrate) that meet at a medium boundary, n1 is the index of refraction of the optical medium in which light is traveling towards the medium boundary (e.g., the waveguide substrate, once the light is coupled therein), and n2 is the index of refraction of the optical medium beyond the medium boundary (e.g., air or some other medium adjacent to the waveguide substrate).

The user 115 can look through the waveguide 510 to see real-world objects on the real-world side of the display device 105 (the real-world side is indicated by reference numeral 512 in FIG. 5). For the virtual part of the FOV of the display system, virtual image light 515 is provided by a virtual image source 520 (e.g., a microdisplay or light engine, etc.). The virtual image light is in-coupled to the waveguide by an input coupler 525 and propagated through the waveguide in total internal reflection. The image light is out-coupled from the waveguide by an output coupler 530. The combination of see-through waveguide and coupling elements may be referred to as a mixed-reality optical combiner 535 because it functions to combine real-world and virtual-world images into a single display.

Typically, in such waveguide-based optical combiners, the input pupil needs to be formed over a collimated field, otherwise each waveguide exit pupil will produce an image at a slightly different distance. This results in a mixed visual experience in which images are overlapping with different focal depths in an optical phenomenon known as focus spread.

In some embodiments, the input coupler 525 and output coupler 530 may be configured as diffractive optical elements (DOEs). DOEs may comprise, for example, surface relief grating (SRG) structures and volumetric holographic grating (VHG) structures. An intermediate DOE (not shown) may also be disposed in the light path between the input coupler and output coupler in some cases. The intermediate DOE may be configured to provide exit pupil expansion in one direction (e.g., horizontal) while the output coupler may be configured to provide exit pupil expansion in a second direction (e.g., vertical).

In alternative embodiments, the optical combiner functionality provided by the waveguide and DOEs may be implemented using a reflective waveguide combiner. For example, partially reflective surfaces may be embedded in a waveguide and/or stacked in a geometric array to implement an optical combiner that uses partial field propagation. The reflectors can be half-tone, dielectric, holographic, polarized thin layer, or be fractured into a Fresnel element.

In other embodiments, the principles of the present control of variable-focus lenses in a mixed-reality device for presbyopes may be implemented using a reflective waveguide combiner with any suitable in-coupling and/or out-coupling methods. A reflective waveguide combiner may utilize a single waveguide in some implementations for all colors in the virtual images which may be desirable in some applications. By comparison, diffractive combiners typically require multiple waveguides to meet a target FOV in polychromatic applications due to limitations on angular range that are dictated by the waveguide TIR condition.

The present control of variable-focus lenses in a mixed-reality device for presbyopes may also be utilized with various other waveguide/coupling configurations beyond reflective and diffractive. For example, it may be appreciated that the principles of the present invention may be alternatively applied to waveguides that are refractive, polarized, hybrid diffractive/refractive, phase multiplexed holographic, and/or achromatic metasurfaces.

A variable-focus lens 540 configured to function as a negative lens is located on the eye side of the waveguide 510 (the eye side is indicated by reference numeral 514 in FIG. 5). The negative lens acts over the entire extent of the eyebox associated with the user's eye to thereby create the diverging rays 545 from the collimated rays 550 that exit the output coupler 530. When the virtual image source 520 is operated to project virtual images that are in-coupled into the waveguide 510, the output diverging rays present the virtual images at a predetermined focal depth, d, from the display system at an apparent or virtual point of focus, F. For example, if the negative lens is configured with -0.5 diopters of optical power, then d is equal to 2 m.

To ensure that the user's view of the real world remains unperturbed by the negative lens, a variable-focus lens 605 is configured to function as a conjugate positive (i.e., convex) lens, as shown in FIG. 6. This variable-focus lens is located on the real-world side of the waveguide 510 to compensate for the impact of the negative lens on the eye side. The conjugate pair of positive and negative lenses may be referred to as a push-pull lens pair in some contexts. For example, if the eye side variable-focus lens is controlled to provide -0.5 diopters of optical power, then the real-world side lens is controlled to provide an opposite +0.5 diopters of optical power to cancel out the effect of the negative lens. Accordingly, light 610 reflected from a real-world object 615 reaches the user with no net optical power being applied by the combined operations of the pair of variable-focus lenses. In this example, the object is in the distance so the parallel rays of real-world light incident on the display system 500 remain parallel when viewed by the user 115.

The eye-side variable-focus lens 540 and real-world-side variable-focus lens 605 may be implemented using various known technologies. Variable-focus lenses may also be referred to as "tunable" lenses. Exemplary technologies include liquid oil push/pull, liquid crystal, reflective MEMS (micro-electromechanical system), MEMS Fresnel structures, geometric phase holograms, meta-surface optical elements, deformable membranes, Alvarez lenses, multi-order DOEs, combinations thereof, and the like. The lenses may be implemented using single optical elements in some applications, or as arrays in other applications.

FIG. 7 is a side view the virtual display system 500 in operative relationship with HMD device components including an eye tracker 705, optical power controller 710, and one or more processors 715. The components and the variable-focus lenses 540 and 605 are operatively coupled by one or more buses as representatively indicated by reference numeral 720. The components may be disposed in a frame (not shown) or other suitable structure of the HMD device 100 or the exemplary HMD device 1600 shown in FIGS. 16 and 17 and described in the accompanying text.

The eye tracker 705 is operatively coupled to one or more illumination sources 725 and one or more sensors 730. For example, the illumination sources may comprise IR (infrared) LEDs that are located around the periphery of the display system 500 (FIG. 5) and/or optical combiner 535 and/or be disposed in some other suitable HMD device component such as a frame. The eye tracker illumination sources can function as glint sources and/or provide general or structured illumination of the user's eye features. The eye tracker sensors may comprise inward-facing cameras that have sensitivity, for example, to IR light. Image-based and/or feature-based eye tracking, or other suitable eye-tracking techniques may be utilized to meet requirements of an implementation of the present control of variable-focus lenses in a mixed-reality device for presbyopes.

In an illustrative example, the IR light from the illumination sources 725 cause highly visible reflections, and the eye tracker sensors 730 capture an image of the eye showing these reflections. The images captured by the sensors are used to identify the reflection of the light source on the cornea (i.e., "glints") and in the pupil. Typically, a vector formed by the angle between the cornea and pupil reflections may be calculated using real-time image analysis, and the vector direction combined with other geometrical features of the reflections is then used to determine where the user is looking - the gaze point - and calculate eye movement, location, and orientation.

During operation of the HMD device 100, the optical power controller 710 controllably varies the optical power of the eye-side variable-focus lens 540 and real-world-side variable focus lens 605. Different amounts of optical power may be utilized at the eye-side variable-focus lens when configured as a negative lens to provide for focal planes that are located at different fixed or variable distances to suit requirements of a particular application. The power of the negative lens does not affect the zeroth diffraction order that travels in TIR down the waveguide 510 (i.e., from top to bottom in the drawings), but instead only the diffracted out-coupled field. In addition, the see-through field is not affected by the negative lens because whatever portion of the see-through field that is diffracted by the output coupler 530 is trapped by TIR in the waveguide and is therefore not transmitted to the user's eye.

A static lens 735 may be optionally utilized in some implementations of the HMD device 100. For example, the static lens may be implemented as an optical insert to a portion of the HMD device such as a sealed visor shown in FIGS. 11-13 and described in the accompanying text. In some HMD devices having size and space limits due to eye-box and/or form factor considerations, it may not be comfortable or possible for users to wear prescription glasses. The static lens can be provided to correct impairments in the vision of the user 115 and may comprise, for example, the user's corrective lens prescription for glasses or contact lenses. The static lens may be used in combination with a modified configuration for the eye-side variable-focus lens discussed below in some scenarios. Worldwide, visual impairments due to refractive errors are distributed among people with myopia, hyperopia, and presbyopia. Corrections for most of the population fall between -6.0 and +4.0 diopters.

FIG. 8 provides an illustrative table 800 that shows illustrative operational configurations for the variable-focus lens pair for different user types and use cases. It may be noted that FIG. 8 refers to the elements shown in FIG. 7. Table 800 shows how the optical power controller 710 may controllably vary the optical power of eye-side variable-focus lens 540 and real-world-side variable-focus lens 605 for different types of users and HMD device use cases. Two different types of presbyopic users are shown in the first column 805 of the table. User 1 is able to see far away real-world objects clearly without glasses. User 1 may have always had clear (i.e., emmetropic) vision but developed presbyopia with age. User 1 may currently use reading glasses to see close real-world objects and read text. For example, prescriptions for reading glasses typically increase by 0.25 diopters, such as +1.00, +1.25, +1.50, and so on.

User 2 may have developed myopia as a child and is unable to see far away real-world objects clearly without corrective lenses such as glasses or contacts. To deal with presbyopia, user 2 may currently use bifocals or progressive lenses, or wear contact lenses for distance vision and don reading glasses for close accommodation. Monovision is another solution in which different accommodative distances are provided each eye of the user via contact lenses or surgical methods, for example. User 2 may also remove or lift their glasses to focus on near objects in some situations.

The second column 810 in table 800 shows two use cases for a presbyopic user of an HMD device, including far viewing and close viewing. It is noted that the terms "close" and "far" are relative to each other and that specific distances associated with each term can vary by context and application of the present principles. Close regions of interest are generally within an arm's length of the user, for example < 1 m and within the near field of an HMD device. The far field for the device may generally start around 2 m and a user's eye generally accommodates to optical infinity around distances of 6 m.

As noted above, virtual images may typically be displayed at fixed focal plane depths of around 1.25 to 2.5 m in mixed-reality HMD and other immersive devices to reduce user discomfort due to VAC. Accordingly, in typical implementations, an objective of the optical power controller 710 is to enable presbyopes to simultaneously view both close virtual and real-world objects in sharp focus through the HMD device.

The third column 815 in table 800 shows the operations of the eye-side variable-focus lens 540 responsive to the optical power controller 710 for each use case and for each user type. The fourth column 820 shows the operations of the real-world-side variable-focus lens 605 responsive to the optical power controller for each use case and for each user type.

For user 1 during far viewing, the eye-side variable-focus lens 540 is operated in its baseline configuration to support the rendering of virtual images at some predetermined mixed-reality focal plane depth. For example, in an illustrative and non-limiting embodiment, the optical power controller 710 can set the optical power of the eye-side variable-focus lens at -0.5 diopters to fix the mixed-reality focal plane at 2 m. In alternative embodiments, focus tuning for the virtual images at some non-infinite distance may be implemented in the optical display system before light for the virtual images is out-coupled from the waveguide to the user's eye. In such alternative embodiments, it may be appreciated that the out-coupled light is not necessarily collimated, and thus the optical power of the eye-side variable-focus lens may be set by the optical power controller to zero or some other suitable value for its baseline configuration. For example, with an optical combiner employing a reflective waveguide having no exit pupil replication, focus tuning may be performed at the virtual image source, at a tunable display engine, or using some other suitable technique. In another alternative embodiment, focus tuning of the virtual images may be performed by the output-coupler.

The optical power controller 710 may operate the real-world-side variable-focus lens 605 in its baseline configuration in which the optical power provided by the eye-side lens is canceled out for real-world image light 610 entering the see-through HMD display system. Here, for example, the baseline configuration for the real-world-side lens may be +0.5 diopters so that the net optical power applied by the lens pair to light from real-world objects equals zero.

For close viewing by user 1, the optical power controller 710 also configures the eye-side variable-focus lens 540 to support the rendering of virtual images at a predetermined mixed-reality focal plane depth, for example 2 m. In addition, the optical power controller 710 adds optical power to the real-world-side variable-focus lens 605 to push close real-world objects optically farther away and into sharp focus for user 1. The amount of added optical power can vary according to one or more of degree of presbyopia experienced by user 1, the amount of ambient light, or other factors. For example, the added optical power could be +1.5 diopters for moderate presbyopia correction.

For far viewing by user 2, the real-world-side variable-focus lens 605 is operated by the optical power controller 710 in its baseline configuration to counteract operations of the eye-side variable-focus lens 540 in its respective baseline configuration. In this illustrative example, the baseline configuration of the real-world-side lens is +0.5 diopters, and the baseline configuration of the eye-side lens is -0.5 diopters, as discussed above.

To enable user 2 to utilize the HMD device 100 without needing to wear glasses or contacts, the optical power controller 710 may operate the eye-side variable-focus lens 540 in a modified configuration. The modified configuration includes incorporating the prescription of the user's corrective lenses into the baseline configuration of the eye-side variable-focus lens. For example, if user 2 has mild myopia with a corrective lens prescription of -1.5 diopters, then the optical power controller 710 can control the eye-side variable-focus lens to provide -2.0 diopters of optical power, in which -1.5 diopters provides for a corrective lens prescription for user 2 and -0.5 diopters provides counteraction for the +0.5 of optical power provided by the real-world-side variable-focus lens.

It may be appreciated that in alternative configurations, various combinations of optical powers can be utilized to meet particular implementation requirements. For example, in the above scenario in which user 2 has a corrective lens prescription of -1.5 diopters, in the far viewing use case, the eye-side variable-focus lens 540 could be controlled to provide -1.5 diopters of optical power and the real-world-side variable-focus lens could be controlled to provide zero optical power. A given lens-pair configuration can depend, for example, on physical characteristics of the HMD device and variable-focus lenses such as switching speed/refresh rate, range of optical powers supported, display FOV, virtual image rendering plane depth, etc., as well as application factors such as motion blur, virtual scene composition, etc.

During close viewing by user 2, the optical power controller 710 can control the eye-side variable-focus lens 540 to provide -2.0 diopters of optical power, as discussed above, to enable the user to simultaneously see both close virtual-world and real-world objects in sharp focus. In addition, the optical power controller adds optical power to the real-world-side variable-focus lens 605 to push close-by real-world objects optically farther away and into sharp focus. The amount of added optical power can vary according to one or more of degree of presbyopia experienced by the user, level of ambient light, or other factors.

Figure 9:
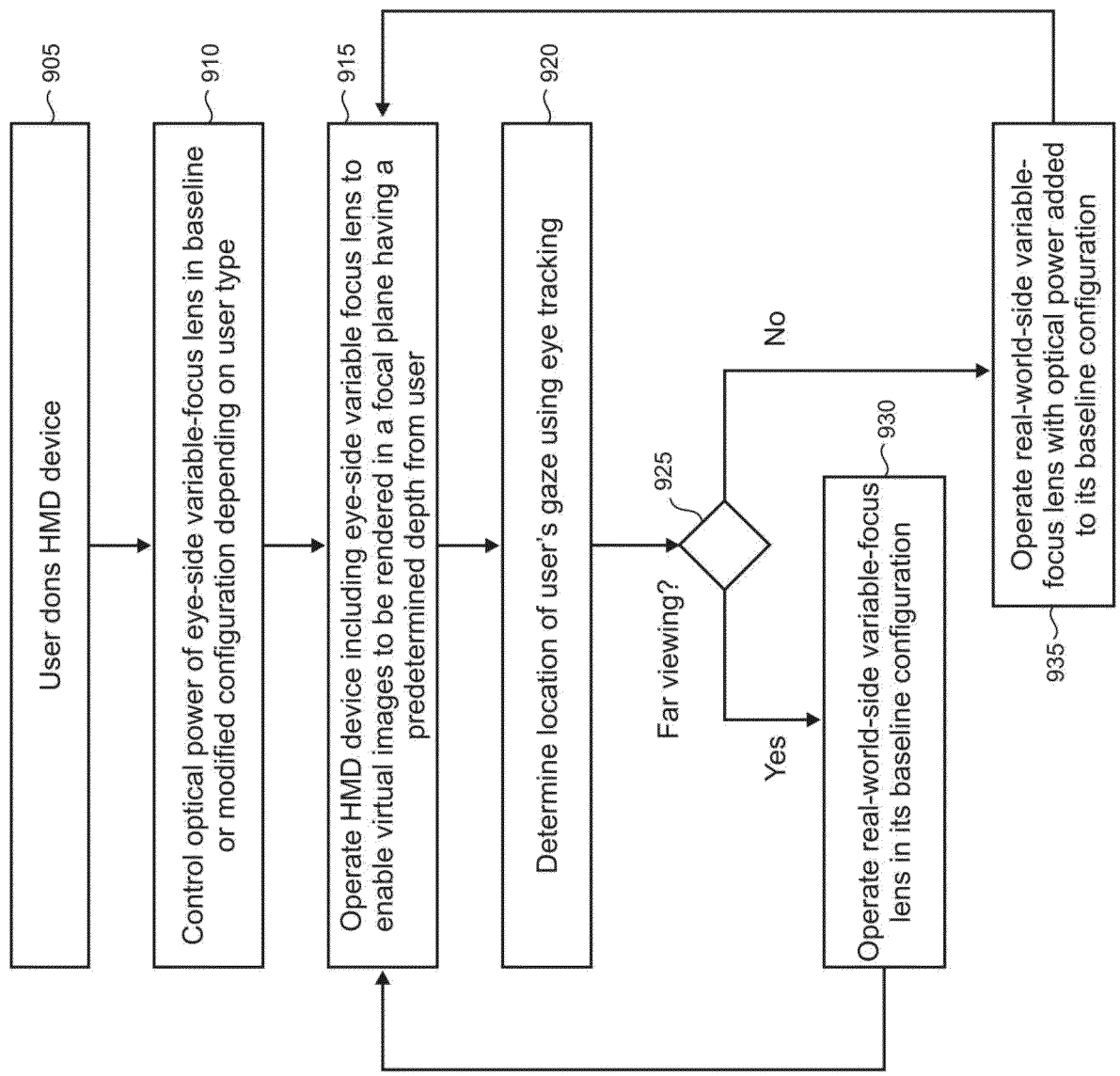
FIG. 9 is a flowchart of an illustrative workflow for operating a variable-focus lens pair in an HMD device.

FIG. 9 is a flowchart of an illustrative method 900 for operating the HMD device 100 that includes an optical display system 500 and an eye tracker 705. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized. FIG. 9 makes references to the elements shown in FIG. 7.

At block 905, the user 115 dons the HMD device 100. Typically, the user will have already undertaken an initialization, personalization, calibration, or other suitable processes or procedures to enhance user comfort and/or enable, for example, various systems and subsystems to perform accurate tracking of eyes, hands, head, and/or other body parts, or provide for virtual image display alignment (e.g., if the HMD device shifts on the user's head). Such processes may be utilized to determine a suitable amount of presbyopia correction to be implemented for the user and identify the user type (e.g., user type 1 or 2 from table 800 shown in FIG. 8). Integration of the user's vision prescription into the HMD device can also be supported by such initialization/personalization/calibration processes to improve visual comfort and enhance mitigation effects for VAC.

At block 910, the optical power controller 710 can control the optical power of the eye-side variable-focus lens 540 depending on user type. The eye-side lens may be operated in its modified configuration responsively to the user being a type 2 user. In the modified configuration, as discussed above when referring to the description accompanying FIG. 8, appropriate optical power for the user's corrective prescription, for example -1.5 diopters, may be added to the baseline configuration. Otherwise, for a type 1 user, the eye-side lens operates just in its baseline configuration to provide for the rendering of virtual images at the fixed focal plane depth (e.g., 2 m).

At block 915, the HMD device 100 including the eye-side variable-focus lens 540 is operated to render one or more virtual images at the predetermined focal plane depth (e.g., 2 m), as appropriate for a given HMD device user experience. At block 920, the location of the user's gaze in the FOV of the display system is determined. The location includes depth along the z axis of the display and may be determined, for example, using vergence tracking of the user's eyes, using a projection of a gaze vector and its intersection with a rendered scene.

At decision block 925, if the determination is made from the eye tracking that the user is looking at far objects, then at block 930, the optical power controller 710 operates the real-world-side variable-focus lens 605 in its baseline configuration. The baseline configuration of the real-world-side lens provides opposite optical power to that of the eye-side variable-focus lens to cancel out the impact of that lens's baseline configuration. For a type 1 user, this means that no net optical power is provided to real-world image light by the variable-lens pair.

For the type 2 user, optical power is provided by the real-world-side lens 605 to offset only the baseline optical power provided by eye-side lens 540 without impacting the added optical power for the user's prescription (e.g., -1.5 diopters) for the modified configuration of the eye-side lens. For example, for a 2 m virtual image focal plane, the eye-side lens is controlled to provide -0.5 diopters of optical power; therefore, the real-world-side lens is controlled to provide +0.5 diopters of optical power as its baseline. This offset enables the eye-side lens to provide the prescribed correction for the type 2 user's distance vision.

If a determination is made at decision block 925 that the user is engaged in close viewing, then at block 935 the optical power controller 710 controls the real-world-side variable-focus lens 605 to add optical power to push close real-world objects optically farther away and into sharp focus for the user. For example, +1.5 diopters for mild presbyopia correction could be added to the +0.5 diopters of baseline optical power of the real-world-side lens.

FIG. 10 is a flowchart of an illustrative method 1000 for operating an electronic device that includes an eye tracker and a mixed-reality see-through optical display system for showing scenes comprising virtual images that are rendered over views of real-world objects. At block 1005, the electronic device is calibrated for utilization by a presbyopic user. Such calibration may include, for example, initially setting up the electronic device such as an HMD device for a particular presbyopic user, personalizing the device to the user such as providing for a corrective prescription, and/or performing suitable procedures to ensure that various systems and subsystems in the device can accurately perform their functions.

At block 1010, the mixed-reality see-through optical display system is operated to support a near field and a far field, in which the near field is closer to the presbyopic user relative to the far field, and in which the mixed-reality see-through optical display system has an eye side and a real-world side. As noted above, 2 m may be considered a threshold between near and far fields, although other threshold distances may be utilized depending on application requirements. At block 1015, a conjugate pair of variable-focus lenses are operated in matched configurations to provide for setting rendered virtual images within the near field without perturbing the views of the real-world objects in the far field. For example, matching configurations include the variable-focus lenses operating to cancel the effects of their respective optical powers.

At block 1020, the eye tracker is used to determine a depth of the presbyopic user's gaze in the scene. At block 1025, responsively to a depth determination by the eye tracker, the conjugate pair of variable-focus lenses are operated in mismatched configurations to enable the presbyopic user to simultaneously accommodate rendered virtual images and real-world objects in the near field. For example, the mismatch can provide for additional optical powering being added to the real-world-side variable focus lens to thereby enable real-world objects in the near field to be pushed out optically and into sharp focus by the presbyopic user.

Figure 12:
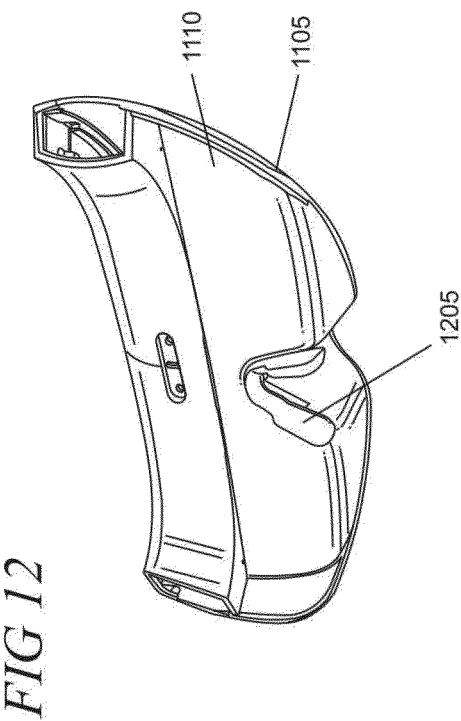
FIG. 12 shows a pictorial rear view of an illustrative sealed visor.
Figure 11:
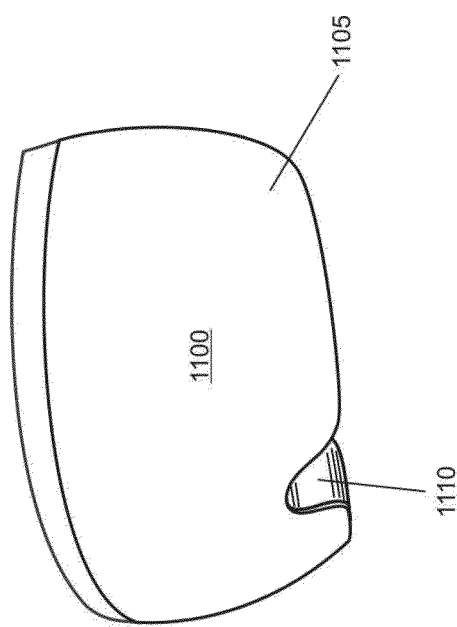
FIG. 11 shows a pictorial front view of an illustrative sealed visor that may be used as a component of an HMD device.
Figure 13:
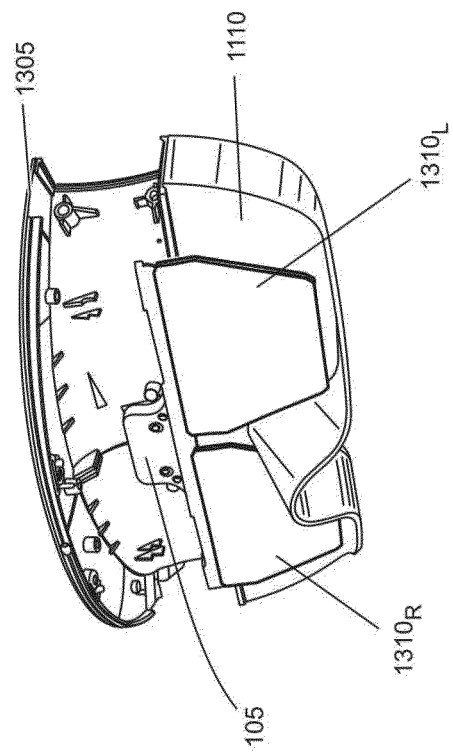
FIG. 13 shows a partially disassembled view of an illustrative sealed visor.

FIGS. 11 and 12 show respective front and rear views of an illustrative example of a visor 1100 that incorporates an internal near-eye display device 105 (FIG. 1) that is used in the HMD device 100 as worn by a user 115. The visor, in some implementations, may be sealed to protect the internal display device. The visor typically interfaces with other components of the HMD device such as head-mounting/retention systems and other subsystems including sensors, power management, controllers, etc., as illustratively described in conjunction with FIGS. 16 and 17. Suitable interface elements (not shown) including snaps, bosses, screws and other fasteners, etc. may also be incorporated into the visor.

The visor 1100 may include see-through front and rear shields, 1105 and 1110 respectively, that can be molded using transparent or partially transparent materials to facilitate unobstructed vision to the display device and the surrounding real-world environment. Treatments may be applied to the front and rear shields such as tinting, mirroring, anti-reflective, anti-fog, and other coatings, and various colors and finishes may also be utilized. The front and rear shields are affixed to a chassis 1305 shown in the disassembled view in FIG. 13.

The sealed visor 1100 can physically protect sensitive internal components, including a display device 105, when the HMD device is operated and during normal handling for cleaning and the like. The display device in this illustrative example includes left and right waveguides $1310_L$ and $1310_R$ that respectively provide holographic virtual images to the user's left and right eyes for mixed– and/or virtual-reality applications. The visor can also protect the display device from environmental elements and damage should the HMD device be dropped or bumped, impacted, etc.

As shown in FIG. 12, the rear shield 1110 is configured in an ergonomically suitable form 1205 to interface with the user's nose, and nose pads and/or other comfort features can be included (e.g., molded-in and/or added-on as discrete components). In some applications, the sealed visor 1110 can also incorporate some level of optical diopter curvature (i.e., eye prescription) within the molded shields in some cases, as discussed above. The sealed visor 1100 can also be configured to incorporate the conjugate lens pair – the negative lens 540 and positive lens 605 (FIG. 6) on either side of display device 105.

Figure 14:
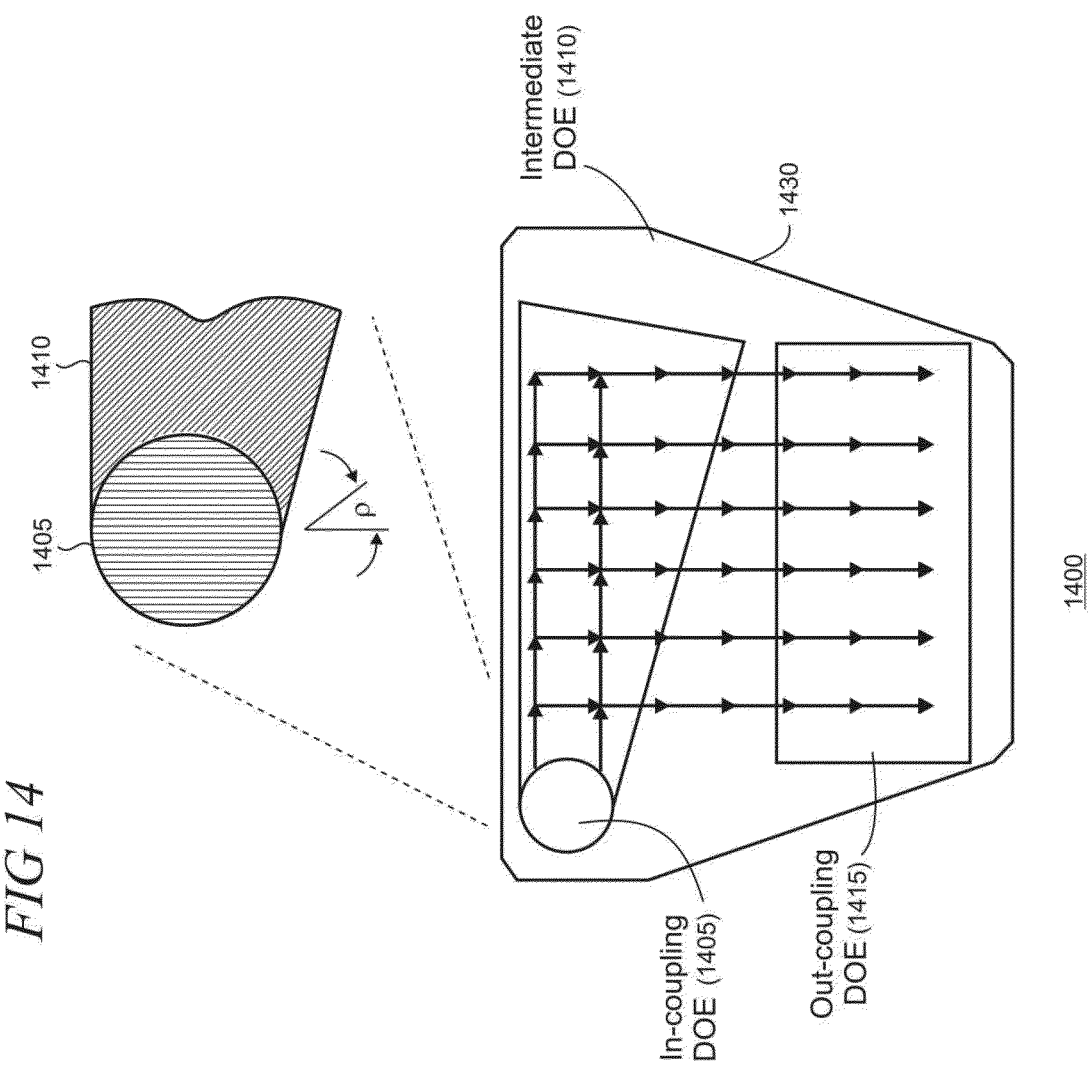
FIG. 14 shows an illustrative arrangement of diffractive optical elements (DOEs) configured for in-coupling, exit pupil expansion in two directions, and out-coupling.

FIG. 14 shows an illustrative waveguide display 1400 having multiple DOEs that may be used as an embodiment of the see-through waveguide 510 in the display device 105 (FIG. 1) to provide in-coupling, expansion of the exit pupil in two directions, and out-coupling. The waveguide display 1400 may be utilized to provide holographic virtual images from a virtual imager to one of the user's eyes. Each DOE is an optical element comprising a periodic structure that can modulate various properties of light in a periodic pattern such as the direction of optical axis, optical path length, and the like. The structure can be periodic in one dimension such as one-dimensional (1D) grating and/or be periodic in two dimensions such as two-dimensional (2D) grating.

The waveguide display 1400 includes an in-coupling DOE 1405, an out-coupling DOE 1415, and an intermediate DOE 1410 that couples light between the in-coupling and out-coupling DOEs. The in-coupling DOE is configured to couple image light comprising one or more imaging beams from a virtual image source 520 (FIG. 5) into a waveguide 1430. The intermediate DOE expands the exit pupil in a first direction along a first coordinate axis (e.g., horizontal), and the out-coupling DOE expands the exit pupil in a second direction along a second coordinate axis (e.g., vertical) and couples light out of the waveguide to the user's eye (i.e., outwards from the plane of the drawing page). The angle ρ is a rotation angle between the periodic lines of the in-coupling DOE and the intermediate DOE as shown. As the light propagates in the intermediate DOE (horizontally from left to right in the drawing), it is also diffracted (in the downward direction) to the out-coupling DOE.

While DOEs are shown in this illustrative example using a single in-coupling DOE disposed to the left of the intermediate DOE 1410, which is located above the out-coupling DOE, in some implementations, the in-coupling DOE may be centrally positioned within the waveguide and one or more intermediate DOEs can be disposed laterally from the in-coupling DOE to enable light to propagate to the left and right while providing for exit pupil expansion along the first direction. It may be appreciated that other numbers and arrangements of DOEs may be utilized to meet the needs of a particular implementation.

Figure 15:
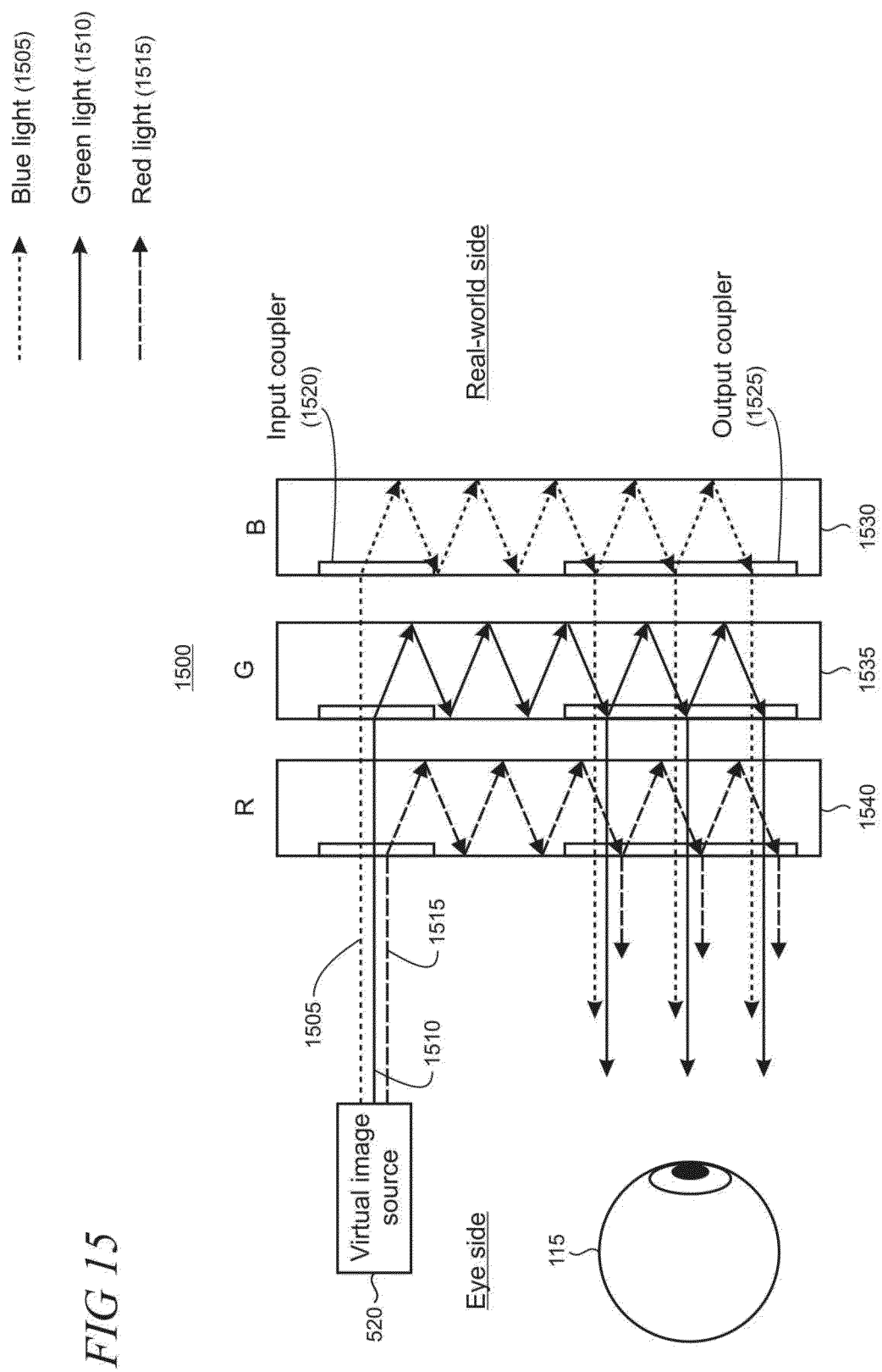
FIG. 15 shows a side view of an illustrative assembly of three waveguides with integrated coupling elements that are stacked to form an optical combiner, in which each waveguide handles a different color in an RGB (red, green, blue) color model.

As noted above, in implementations using a color model such as RGB, multiple waveguides may be utilized in the display device 105 (FIG. 1). FIG. 15 shows illustrative propagation of light from the virtual image source 520 through an optical combiner 1500 that uses a separate waveguide for each color component in the RGB color model. In alternative implementations, two waveguides may be utilized in which one waveguide can support two color components and the other waveguide may support a single color component.

For a given angular range within the virtual FOV, light for each color component 1505, 1510, and 1515 provided by the virtual image source 520 is in-coupled into respective waveguides 1530, 1535, and 1540 using respective individual input couplers (representatively indicated by element 1520). The light for each color propagates through the respective waveguides in TIR and is out-coupled by respective output couplers (representatively indicated by element 1525) to the user's eye 115. In some implementations the output may have an expanded pupil relative to the input in the horizontal and vertical directions, for example when using DOEs that provide for pupil expansion, as discussed above.

The input coupler 1520 for each waveguide 1530, 1535, and 1540 is configured to in-couple light within an angular range described by the FOV and within a particular wavelength range into the waveguide. Light outside the wavelength range passes through the waveguide. For example, the blue light 1505 is outside the range of wavelength sensitivity for both of the input couplers in the red waveguide 1540 and green waveguide 1535. The blue light therefore passes through the red and green waveguides to reach the in-coupling DOE in the blue waveguide 1530 where it is in-coupled, propagated in TIR within the waveguide, propagated to the output coupler and out-coupled to the user's eye 115.

Figure 16:
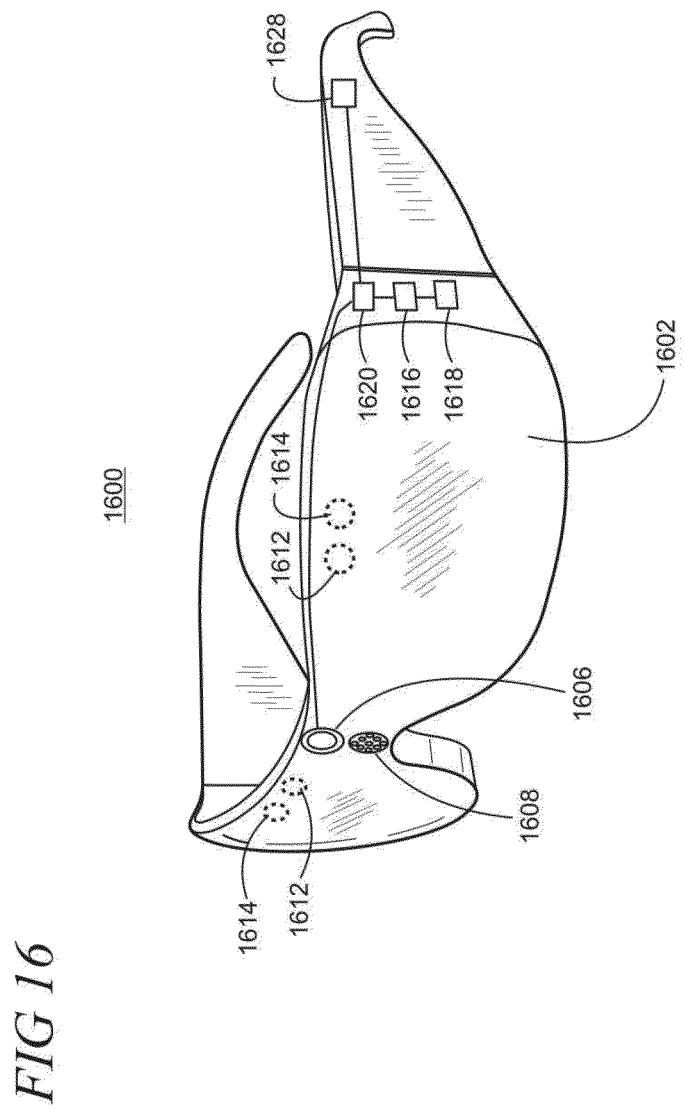
FIG. 16 is a pictorial view of an illustrative example of a virtual-reality or mixed-reality HMD device that may use the present control of variable-focus lenses in a mixed-reality device for presbyopes.
Figure 17:
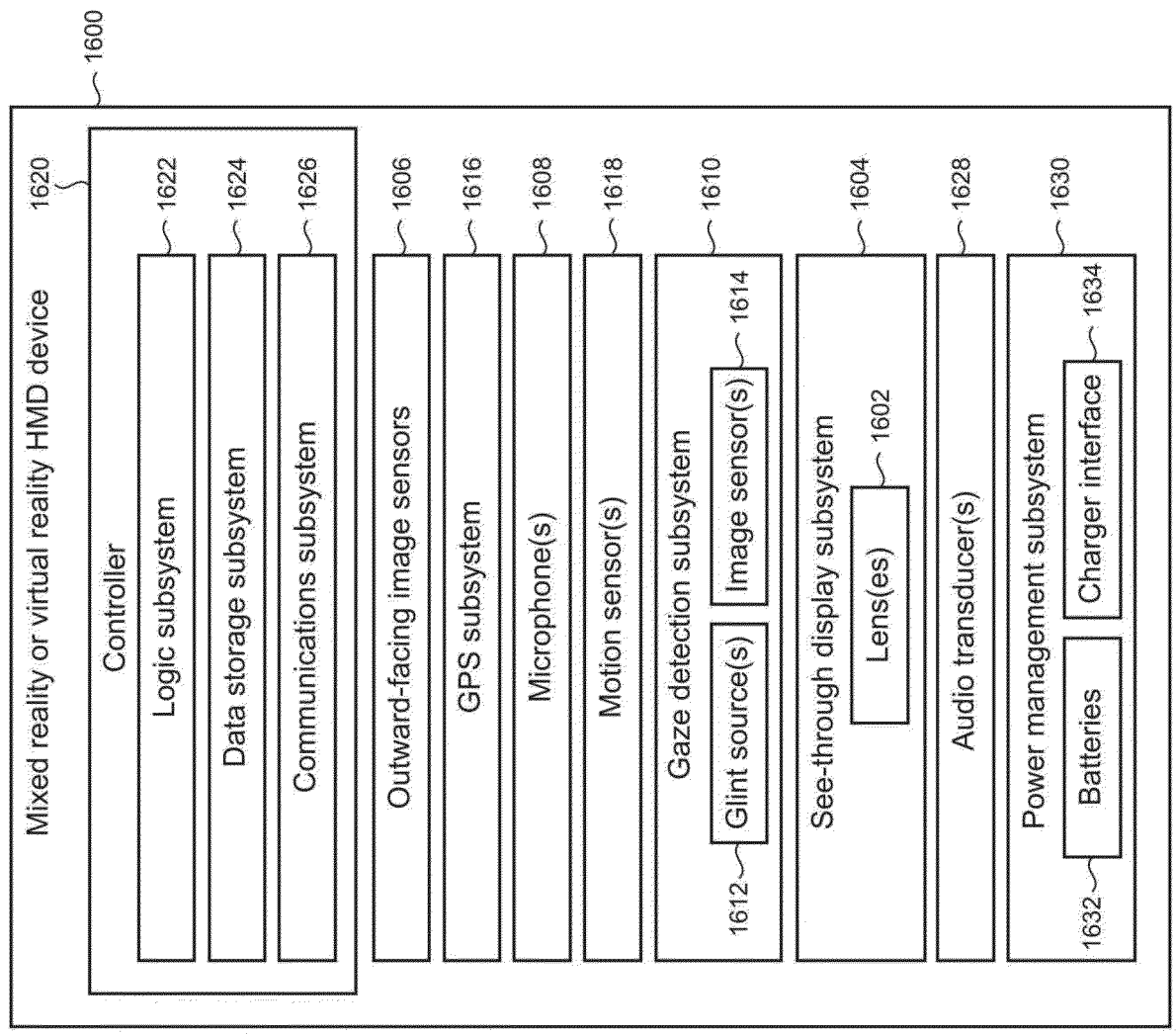
FIG. 17 shows a block diagram of an illustrative example of a virtual-reality or mixed-reality HMD device that may use the present control of variable-focus lenses in a mixed-reality device for presbyopes.

As noted above, the present control of variable-focus lenses in a mixed-reality device for presbyopes may be utilized in mixed- or virtual-reality applications. FIG. 16 shows one particular illustrative example of a mixed-reality HMD device 1600, and FIG. 17 shows a functional block diagram of the device 1600. The HMD device 1600 provides an alternative form factor to the HMD device 100 shown in FIGS. 1, 2, 11, 12, and 13. HMD device 1600 comprises one or more lenses 1602 that form a part of a see-through display subsystem 1604, so that images may be displayed using lenses 1602 (e.g., using projection onto lenses 1602, one or more waveguide systems, such as a near-eye display system, incorporated into the lenses 1602, and/or in any other suitable manner).

HMD device 1600 further comprises one or more outward-facing image sensors 1606 configured to acquire images of a background scene and/or physical environment being viewed by a user and may include one or more microphones 1608 configured to detect sounds, such as voice commands from a user. Outward-facing image sensors 1606 may include one or more depth sensors and/or one or more two-dimensional image sensors. In alternative arrangements, as noted above, a mixed-reality or virtual-reality display system, instead of incorporating a see-through display subsystem, may display mixed-reality or virtual-reality images through a viewfinder mode for an outward-facing image sensor.

The HMD device 1600 may further include a gaze detection subsystem 1610 configured for detecting a direction of gaze of each eye of a user or a direction or location of focus, as described above. Gaze detection subsystem 1610 may be configured to determine gaze directions of each of a user's eyes in any suitable manner. For example, in the illustrative example shown, a gaze detection subsystem 1610 includes one or more glint sources 1612, such as virtual IR light or visible sources as described above, that are configured to cause a glint of light to reflect from each eyeball of a user, and one or more image sensors 1614, such as inward-facing sensors, that are configured to capture an image of each eyeball of the user. Changes in the glints from the user's eyeballs and/or a location of a user's pupil, as determined from image data gathered using the image sensor(s) 1614, may be used to determine a direction of gaze.

In addition, a location at which gaze lines projected from the user's eyes intersect the external display may be used to determine an object at which the user is gazing (e.g., a displayed virtual object and/or real background object). Gaze detection subsystem 1610 may have any suitable number and arrangement of light sources and image sensors. In some implementations, the gaze detection subsystem 1610 may be omitted.

The HMD device 1600 may also include additional sensors. For example, HMD device 1600 may comprise a global positioning system (GPS) subsystem 1616 to allow a location of the HMD device 1600 to be determined. This may help to identify real-world objects, such as buildings, etc., that may be located in the user's adjoining physical environment.

The HMD device 1600 may further include one or more motion sensors 1618 (e.g., inertial, multi-axis gyroscopic, or acceleration sensors) to detect movement and position/orientation/pose of a user's head when the user is wearing the system as part of a mixed-reality or virtual-reality HMD device. Motion data may be used, potentially along with eye-tracking glint data and outward-facing image data, for gaze detection, as well as for image stabilization to help correct for blur in images from the outward-facing image sensor(s) 1606. The use of motion data may allow changes in gaze direction to be tracked even if image data from outward-facing image sensor(s) 1606 cannot be resolved.

In addition, motion sensors 1618, as well as microphone(s) 1608 and gaze detection subsystem 1610, also may be employed as user input devices, such that a user may interact with the HMD device 1600 via gestures of the eye, neck and/or head, as well as via verbal commands in some cases. It may be understood that sensors illustrated in FIGS. 16 and 17 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 1600 can further include a controller 1620 such as one or more processors having a logic subsystem 1622 and a data storage subsystem 1624 in communication with the sensors, gaze detection subsystem 1610, display subsystem 1604, and/or other components through a communications subsystem 1626. The communications subsystem 1626 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1624 may include instructions stored thereon that are executable by logic subsystem 1622, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 1600 is configured with one or more audio transducers 1628 (e.g., speakers, earphones, etc.) so that audio can be utilized as part of a mixed-reality or virtual-reality experience. A power management subsystem 1630 may include one or more batteries 1632 and/or protection circuit modules (PCMs) and an associated charger interface 1634 and/or remote power interface for supplying power to components in the HMD device 1600.

It may be appreciated that the HMD device 1600 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Figure 18:
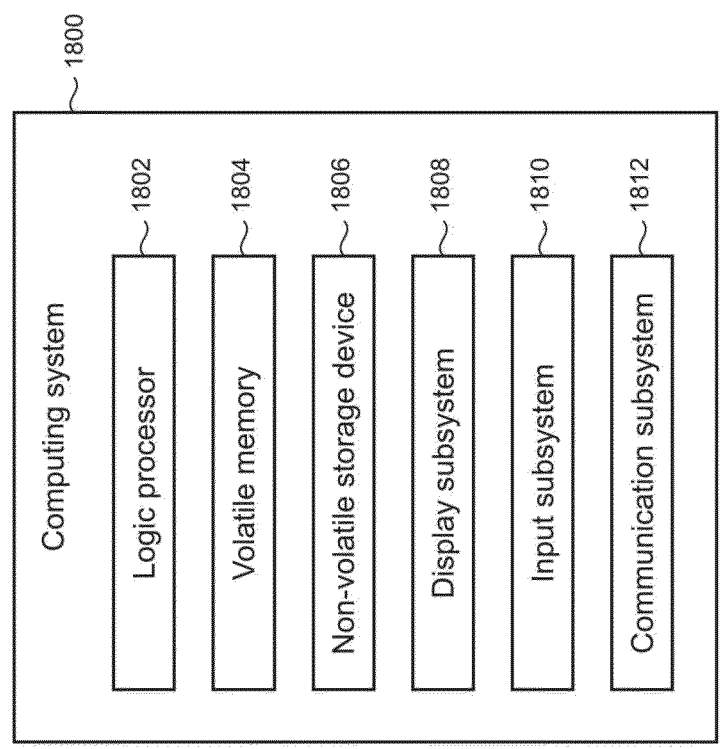
FIG. 18 schematically shows an illustrative example of a computing system that can enact one or more of the methods and processes described above for the present control of variable-focus lenses in a mixed-reality device for presbyopes.

FIG. 18 schematically shows an illustrative example of a computing system that can enact one or more of the methods and processes described above for the present control of variable-focus lenses in a mixed-reality device for presbyopes. Computing system 1800 is shown in simplified form. Computing system 1800 may take the form of one or more personal computers, server computers, tablet computers, home-entertainment computers, network computing devices, gaming devices, mobile computing devices, mobile communication devices (e.g., smartphone), wearable computers, and/or other computing devices.

Computing system 1800 includes a logic processor 1802, volatile memory 1804, and a non-volatile storage device 1806. Computing system 1800 may optionally include a display subsystem 1808, input subsystem 1810, communication subsystem 1812, and/or other components not shown in FIG. 18.

Logic processor 1802 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more processors configured to execute software instructions. In addition, or alternatively, the logic processor may include one or more hardware or firmware logic processors configured to execute hardware or firmware instructions. Processors of the logic processor may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Non-volatile storage device 1806 includes one or more physical devices configured to hold instructions executable by the logic processors to implement the methods and processes described herein. When such methods and processes are implemented, the state of non-volatile storage device 1806 may be transformed-e.g., to hold different data.

Non-volatile storage device 1806 may include physical devices that are removable and/or built-in. Non-volatile storage device 1806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1806 may include nonvolatile, dynamic, static, read/write, read-only, sequential-access, location-addressable, file-addressable, and/or content-addressable devices. It will be appreciated that non-volatile storage device 1806 is configured to hold instructions even when power is cut to the non-volatile storage device 1806.

Volatile memory 1804 may include physical devices that include random access memory. Volatile memory 1804 is typically utilized by logic processor 1802 to temporarily store information during processing of software instructions. It will be appreciated that volatile memory 1804 typically does not continue to store instructions when power is cut to the volatile memory 1804.

Aspects of logic processor 1802, volatile memory 1804, and non-volatile storage device 1806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 1800 typically implemented in software by a processor to perform a particular function using portions of volatile memory, which function involves transformative processing that specially configures the processor to perform the function. Thus, a program may be instantiated via logic processor 1802 executing instructions held by non-volatile storage device 1806, using portions of volatile memory 1804. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 1808 may be used to present a visual representation of data held by non-volatile storage device 1806. This visual representation may take the form of a graphical user interface (GUI). As the herein described methods and processes change the data held by the non-volatile storage device, and thus transform the state of the non-volatile storage device, the state of display subsystem 1808 may likewise be transformed to visually represent changes in the underlying data. Display subsystem 1808 may include one or more display devices utilizing virtually any type of technology; however, one utilizing a MEMS projector to direct laser light may be compatible with the eye-tracking system in a compact manner. Such display devices may be combined with logic processor 1802, volatile memory 1804, and/or non-volatile storage device 1806 in a shared enclosure, or such display devices may be peripheral display devices.

When included, input subsystem 1810 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1812 may be configured to communicatively couple various computing devices described herein with each other, and with other devices. Communication subsystem 1812 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1800 to send and/or receive messages to and/or from other devices via a network such as the Internet.

Various exemplary embodiments of the present control of variable-focus lenses in a mixed-reality device for presbyopes are now presented by way of illustration and not as an exhaustive list of all embodiments. An example includes a mixed-reality display system that is utilizable by a presbyopic user, comprising: a see-through optical combiner through which real-world objects are viewable by the user, the see-through optical combiner being adapted to display virtual-world images that are superimposed over the real-world objects over an eyebox of the display system, the see-through optical combiner having an eye-side and a real-world side; a first variable-focus lens disposed on the eye-side of the see-through optical combiner; a second variable-focus lens disposed on the real-world side of the see-through optical combiner; and an optical power controller operatively coupled to the first and second variable-focus lenses, in which the optical power controller controls a baseline configuration for each of the first and second variable-focus lenses, wherein the optical power controller is adapted to add positive optical power to the baseline configuration of the second variable-focus lens responsive to the presbyopic user accommodating to the predetermined distance or less than the predetermined distance.

In another example, the baseline configuration for the first variable-focus lens provides negative optical power over the eyebox to display the virtual-world images in a focal plane at a predetermined distance from the user, and the baseline configuration of the second variable-focus lens provides positive optical power to offset the negative power of the first variable-focus lens. In another example, the baseline configuration for the first variable-focus lens comprises negative optical power having of a range between -0.20 and -3.0 diopters. In another example, the baseline configuration for the second variable-focus lens includes optical power comprising a positive conjugate of the negative optical power of the baseline configuration of the first variable-focus lens. In another example, each of the variable-focus lenses comprises technologies using one or more of liquid oil push/pull, liquid crystal, reflective MEMS (micro-electromechanical system), MEMS Fresnel structures, geometric phase holograms, meta-surface optical elements, deformable membranes, Alvarez lenses, or multi-order DOEs (diffractive optical elements). In another example, the mixed-reality display system is configured for use in a head-mounted display (HMD) device wearable by the presbyopic user.

A further example includes a head-mounted display (HMD) device wearable by a presbyopic user and configured for supporting a mixed-reality experience including viewing, by the presbyopic user, of holographic images from a virtual world that are combined with views of real-world objects in a physical world, comprising: a see-through display system through which the presbyopic user can view the real-world objects and on which the holographic images are displayed within a field of view (FOV) of the see-through display system; a negative lens disposed between the see-through display system and an eye of the presbyopic user, the negative lens acting over the FOV and configured to render the holographic images at a focal plane having a predetermined depth from the presbyopic user; a variable-focus positive lens disposed on an opposite side of the see-through display system from the negative lens, the variable-focus positive lens being controllably configured to cancel effects of the negative lens on the views of the real-world objects responsive to the presbyopic user being engaged in viewing beyond the predetermined depth, and the variable-focus positive lens being controllably configured with increased optical power to optically push real-world objects into sharp focus responsive to the presbyopic user being engaged in viewing within the predetermined depth.

In another example, the HMD device further comprises an optical power controller operatively coupled to the variable-focus positive lens. In another example, the HMD device further comprises an eye tracker operatively coupled to the optical power controller, the eye tracker tracking vergence of the presbyopic user's eyes or tracking a gaze direction of at least one eye of the presbyopic user, in which the optical power controller controls the variable-focus positive lens responsively to operations of the eye tracker. In another example, the HMD device further comprises one or more illumination sources for producing glints for the eye tracker. In another example, the HMD device further comprises one or more sensors configured to capture glints from the illumination sources that are reflected from features of an eye of the user for eye tracking. In another example, the negative lens comprises a variable-focus lens that is operatively coupled to the optical power controller. In another example, the optical power controller is configured to control the negative lens to include a corrective lens prescription for an eye of the presbyopic user. In another example, the corrective lens prescription provides correction for myopia. In another example, the see-through display system comprises one or more waveguides that each include an input coupler and an output coupler, in which the input coupler is configured to in-couple one or more optical beams for the holographic images into the waveguide from a virtual image source and the output coupler is configured to out-couple the holographic image beams from the waveguide to an eye of the presbyopic user, in which holographic images associated with the out-coupled beams are rendered within the FOV of the display system. In another example, the input coupler and output coupler each comprise a diffractive optical element (DOE) and in which each of the one or more display system waveguides further comprise an intermediate DOE disposed on a light path between the input coupler and the output coupler, wherein the intermediate DOE provides exit pupil expansion of the display system in a first direction and the output coupler provides exit pupil expansion of the display system in a second direction. In another example, the predetermined depth is within arm's length of the presbyopic user.

A further example includes a method for operating an electronic device that includes an eye tracker and a mixed-reality see-through optical display system for showing scenes comprising virtual images that are rendered over views of real-world objects, the method comprising: calibrating the electronic device for utilization by a presbyopic user; operating the mixed-reality see-through optical display system to support a near field and a far field, the near field being closer to the presbyopic user relative to the far field, and the mixed-reality see-through optical display system having an eye side and a real-world side; operating a conjugate pair of variable-focus lenses in matched configurations to provide for setting rendered virtual images within the near field without perturbing the views of the real-world objects in the far field; using the eye tracker to determine a depth of the presbyopic user's gaze in the scene; and responsively to a depth determination by the eye tracker, operating the conjugate pair of variable-focus lenses in mismatched configurations to enable the presbyopic user to simultaneously accommodate rendered virtual images and real-world objects in the near field.

In another example, variable-focus lenses in the conjugate pair are located on opposite sides of the mixed-reality see-through optical display system, and in which the matched configurations comprise the conjugate pair of variable-focus lenses providing zero net optical power to the views of the real-world objects, and in which the mismatched configuration comprises optical power being added to the variable-focus lens disposed on the real-world side. In another example, the method further comprises adding optical power to the variable-focus lens on the eye side to incorporate a corrective prescription of the presbyopic user for distance vision.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mixed-reality display system that is utilizable by a presbyopic user, comprising:
   a see-through optical combiner through which real-world objects are viewable by the user, the see-through optical combiner being adapted to display virtual-world images that are superimposed over the real-world objects over an eyebox of the display system, the see-through optical combiner having an eye-side and a real-world side;
   a first variable-focus lens disposed on the eye-side of the see-through optical combiner;
   a second variable-focus lens disposed on the real-world side of the see-through optical combiner;
   an optical power controller operatively coupled to the first and second variable-focus lenses, in which the optical power controller controls a baseline configuration for each of the first and second variable-focus lenses; and
   an eye tracker operatively coupled to the optical power controller, the eye tracker tracking vergence of the presbyopic user's eyes or tracking a gaze direction of at least one eye of the presbyopic user to determine whether the presbyopic user is accommodating to a predetermined distance, in which the optical power controller controls the variable-focus positive lens responsively to operations of the eye tracker,
   wherein the optical power controller is adapted to add positive optical power to the baseline configuration of the second variable-focus lens responsive to the determination that the presbyopic user is accommodating to the predetermined distance or less than the predetermined distance.

2. The mixed-reality display system of claim 1 in which the baseline configuration for the first variable-focus lens provides negative optical power over the eyebox to display the virtual-world images in a focal plane at a predetermined distance from the user, and the baseline configuration of the second variable-focus lens provides positive optical power to offset the negative power of the first variable-focus lens.

3. The mixed-reality display system of claim 2 in which the baseline configuration for the first variable-focus lens comprises negative optical power having of a range between -0.20 and -3.0 diopters.

4. The mixed-reality display system of claim 2 in which the baseline configuration for the second variable-focus lens includes optical power comprising a positive conjugate of the negative optical power of the baseline configuration of the first variable-focus lens.

5. The mixed-reality display system of claim 1 in which each of the variable-focus lenses comprises technologies using one or more of liquid oil push/pull, liquid crystal, reflective MEMS (micro-electromechanical system), MEMS Fresnel structures, geometric phase holograms, meta-surface optical elements, deformable membranes, Alvarez lenses, or multi-order DOEs (diffractive optical elements).

6. The mixed-reality display system of claim 1 as configured for use in a head-mounted display (HMD) device wearable by the presbyopic user.

7. A head-mounted display (HMD) device wearable by a presbyopic user and configured for supporting a mixed-reality experience including viewing, by the presbyopic user, of holographic images from a virtual world that are combined with views of real-world objects in a physical world, comprising:
   a see-through display system through which the presbyopic user can view the real-world objects and on which the holographic images are displayed within a field of view (FOV) of the see-through display system;
   a negative lens disposed between the see-through display system and an eye of the presbyopic user, the negative lens acting over the FOV and configured to render the holographic images at a focal plane having a predetermined distance from the presbyopic user;
   a variable-focus positive lens disposed on an opposite side of the see-through display system from the negative lens, the variable-focus positive lens being controllably configured to cancel effects of the negative lens on the views of the real-world objects responsive to the presbyopic user being engaged in viewing beyond the predetermined distance, and the variable-focus positive lens being controllably configured with increased optical power to optically push real-world objects into sharp focus responsive to a determination that the presbyopic user is accommodating within the predetermined distance;
   an optical power controller operatively coupled to the variable-focus positive lens; and
   an eye tracker operatively coupled to the optical power controller, the eye tracker tracking vergence of the presbyopic user's eyes or tracking a gaze direction of at least one eye of the presbyopic user to determine whether the presbyopic user is accommodating within the predetermined distance, in which the optical power controller controls the variable-focus positive lens responsively to operations of the eye tracker.

8. The HMD device of claim 7 further comprising one or more illumination sources for producing glints for the eye tracker.

9. The HMD device of claim 8 further comprising one or more sensors configured to captrue glints from the illumination sources that are reflected from features of an eye of the user for eye tracking.

10. The HMD device of claim 7 in which the the negative lense comprises a variable-focus lens that is operatively coupled to the optical power controller.

11. The HMD device of claim 10 in which the the optical power controller is configured to control the negative lens to include a corrective lense prescription for an eye of the presbyopic user.

12. The HMD device of claim 11 in which the corrective lense prescription provides correction for myopia.

13. The HMD device of claim 7 in which the see-through display system comprises one or more waveguides that each include an input coupler and an output coupler, in which the input coupler is configured to in-couple one or more optical beams for the holographic images into the waveguide from a virtual image source and the output coupler is configured to out-couple the holgoraphic image beams from the waveguide to an eye of the presbyopic user, in which holographic images associated with the out-coupled beams are rendered with the FOV of the display system.

14. The HMD device of claim 13 in which the input coupler and output coupler each comprise a diffractive optical element (DOE) and in which each of the one or more display sstem waveguides further comprise an intermediate DOE disposed on a light path between the input coupler and the output coupler, wherein the intermediate DOE provides exit pupil exansion of the display syhstem in a first direction and the output coupler provides exit pupil expansion of the display system in a secon direction.

15. The HMD device of claim 7 in which the predetermined depth is within arm's length of the presbyopic user.

* * * * *